United States Patent [19]

Bolin

[11] Patent Number: 5,429,651

[45] Date of Patent: Jul. 4, 1995

[54] APPARATUS FOR TRANSFERRING GLASS ARTICLES FROM AN IS TO A HIGH SPEED TRANSFER CONVEYOR

[75] Inventor: James A. Bolin, Tulsa, Okla.

[73] Assignee: I.M.T.E.C. Enterprises, Inc., Tulsa, Okla.

[21] Appl. No.: 998,537

[22] Filed: Dec. 30, 1992

[51] Int. Cl.⁶ .............................................. C03B 9/453
[52] U.S. Cl. ........................................ 65/241; 65/260; 198/468.01; 198/430
[58] Field of Search ..................... 65/260, 348, 241; 198/468.01, 740, 430, 426

[56] References Cited

U.S. PATENT DOCUMENTS

| | | | |
|---|---|---|---|
| 2,660,831 | 12/1953 | Rowe | 65/260 |
| 3,040,867 | 6/1962 | Pasten et al. | 198/430 |
| 3,072,240 | 1/1963 | Allgeyer | 65/260 |
| 3,137,394 | 6/1964 | Trudeau | 65/260 |
| 3,184,031 | 1/1965 | Dunlap | 198/430 |
| 3,220,566 | 11/1965 | Rowe | 65/260 |
| 3,559,425 | 2/1971 | Irwin et al. | 65/260 |
| 3,583,862 | 2/1971 | Stacey | 65/348 |
| 3,650,725 | 3/1972 | Okumura et al. | 68/260 |
| 3,960,266 | 6/1976 | Becker | 198/430 |
| 4,244,725 | 1/1981 | Fenton | 65/260 |
| 4,708,727 | 11/1987 | Cordenas-Fianco et al. | 65/160 |
| 4,892,183 | 1/1990 | Fenton | 65/260 |
| 5,037,466 | 8/1991 | Voisine | 65/260 |
| 5,044,488 | 9/1991 | Bolin | 198/430 |
| 5,092,449 | 3/1992 | Bolin et al. | 198/430 |

FOREIGN PATENT DOCUMENTS 1221570  11/1966  Germany.
0151739  11/1981  Germany.
2174667  11/1986  United Kingdom.

Primary Examiner—W. Gary Jones
Assistant Examiner—John Hoffmann
Attorney, Agent, or Firm—John R. Ley; John B. Phillipe

[57] ABSTRACT

A pusher mechanism of an IS transfers a plurality of glass bottles onto a conveyor belt by rotating the bottles through an arc to align the bottles with the conveyor belt while simultaneously linearly moving the bottles at a converging acute angle toward the conveyor belt. The combined rotational and linear movements effectively lengthen the radius of curvature of the path of the bottles and increases the speed of the bottles onto the conveyor belt. The centrifugal force applied to the bottles is limited or reduced to allow the bottles to be more quickly moved onto the conveyor belt without introducing instabilities in the bottles. Other horizontal and vertical movements may be applied. A nozzle may be positioned to deliver a flow of air against the bottles to counteract instabilities. A take-out mechanism used with the pusher mechanism rotates the bottles at an acute angle to the conveyor belt. This initial acute angle reduces the amount of rotation which the pusher mechanism must impart when placing the bottles on the conveyor, thus reducing the possibility of introducing instabilities.

28 Claims, 14 Drawing Sheets

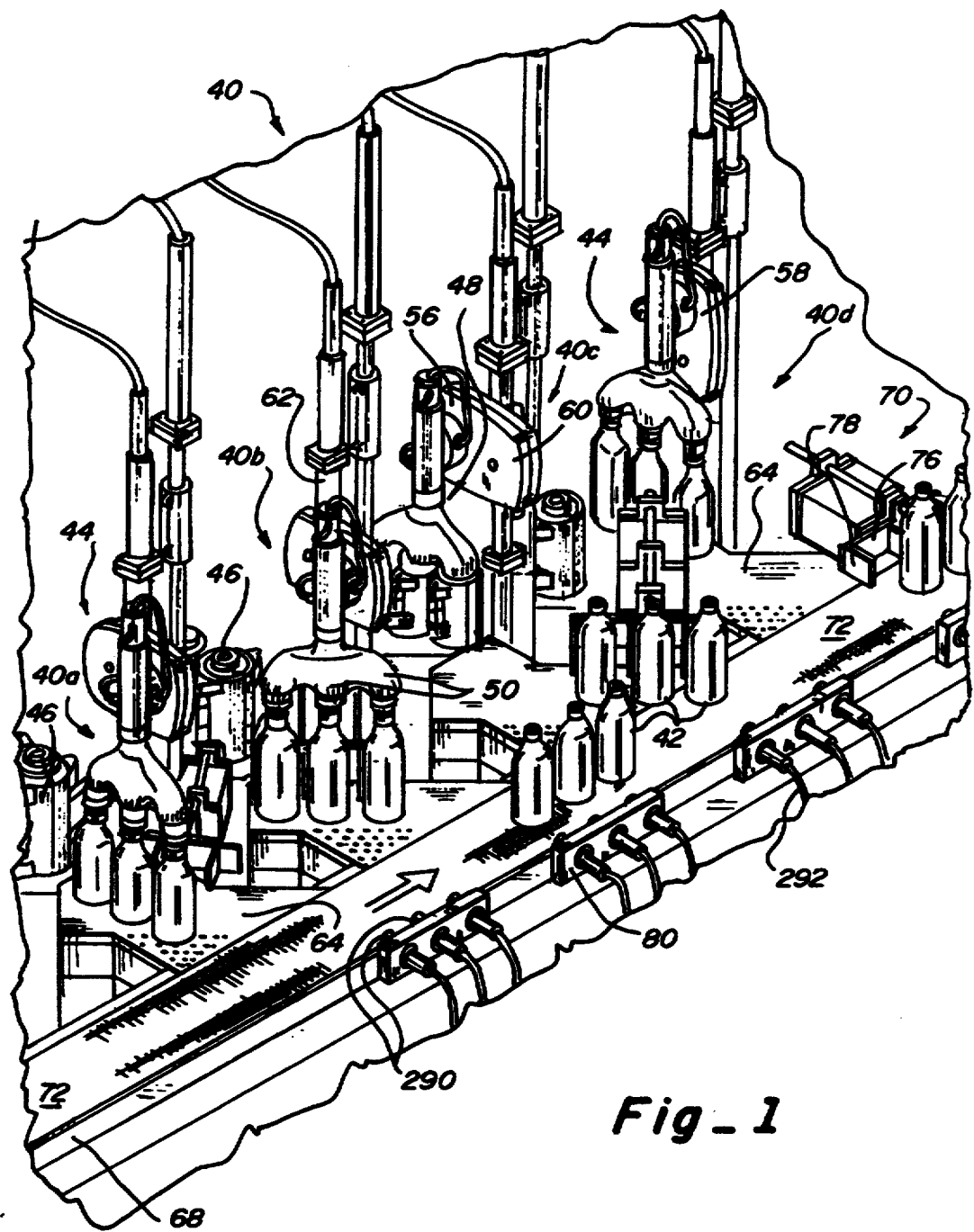
Fig_1

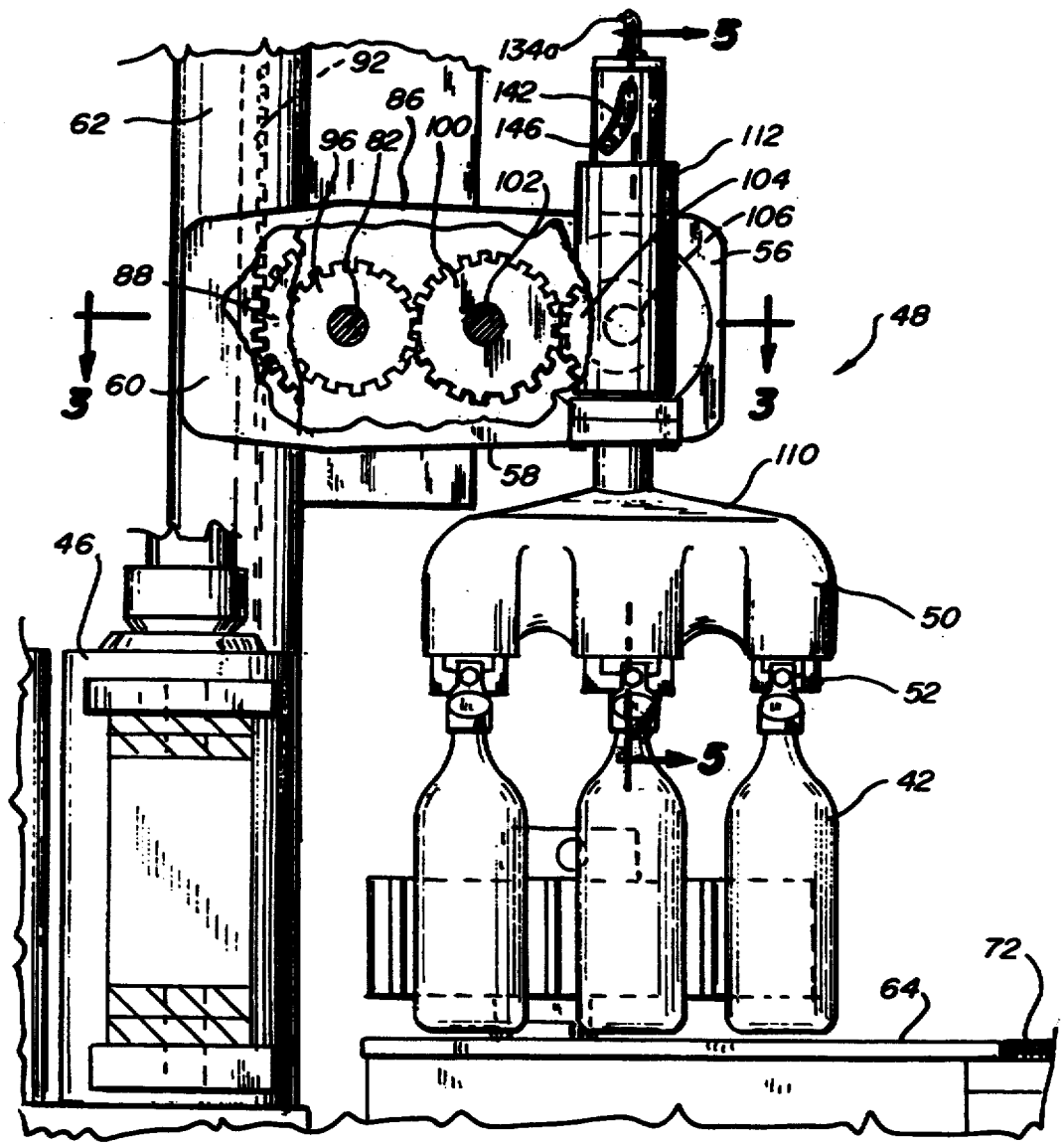
Fig_2

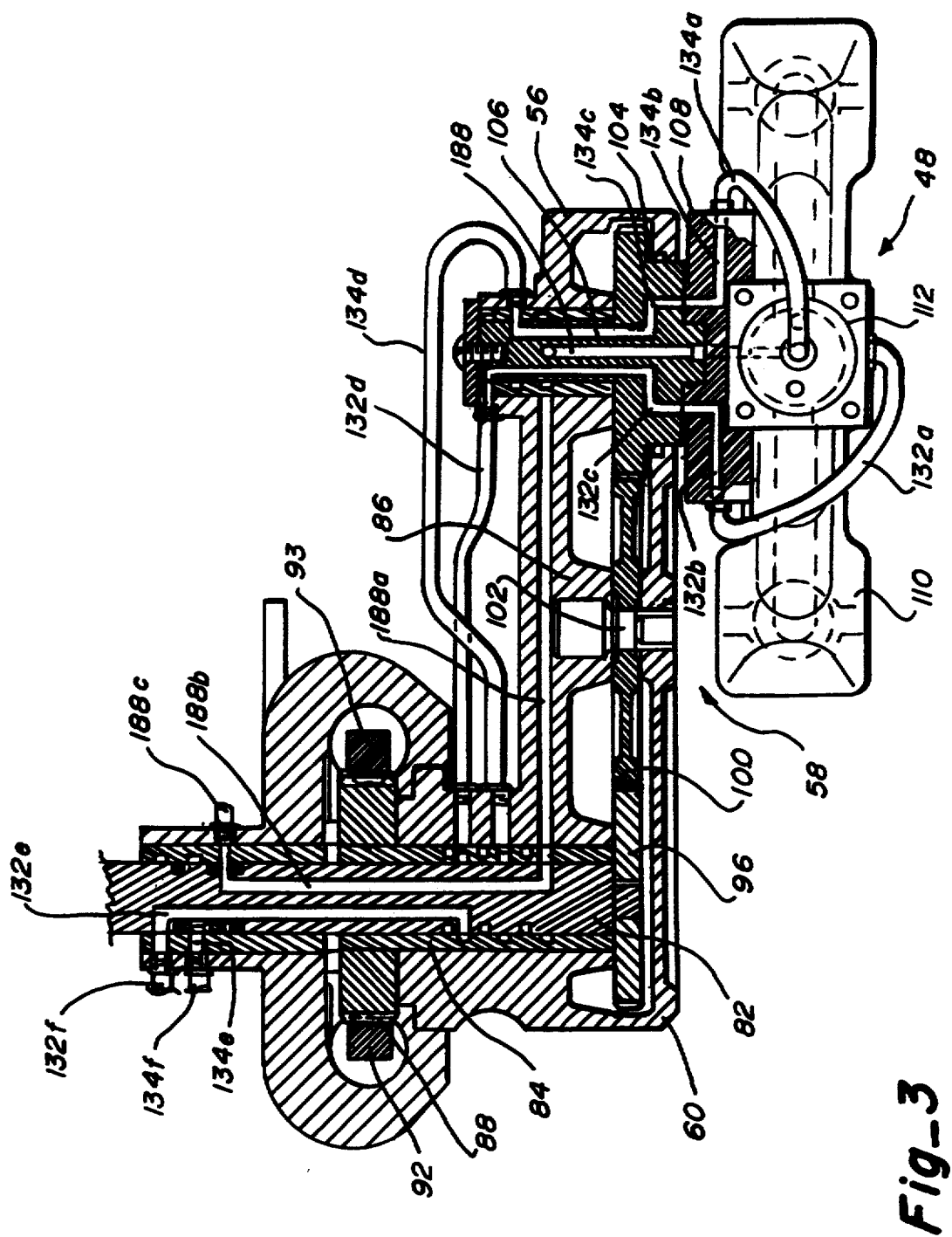

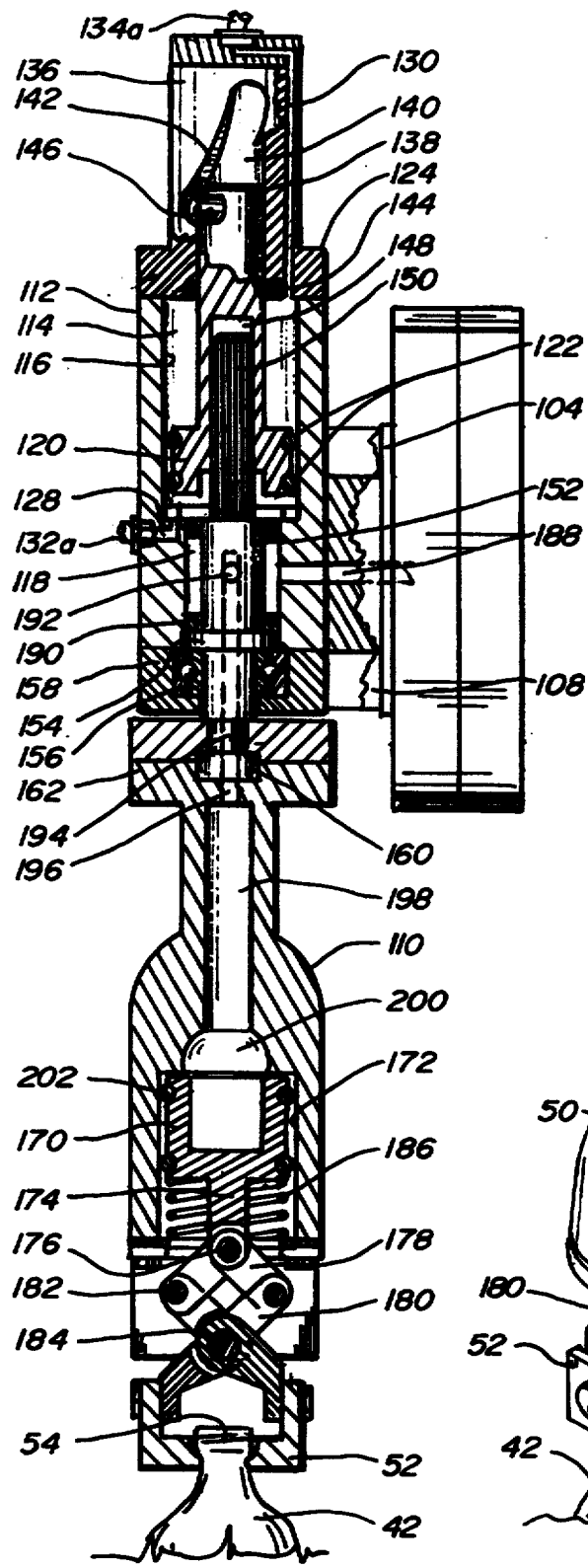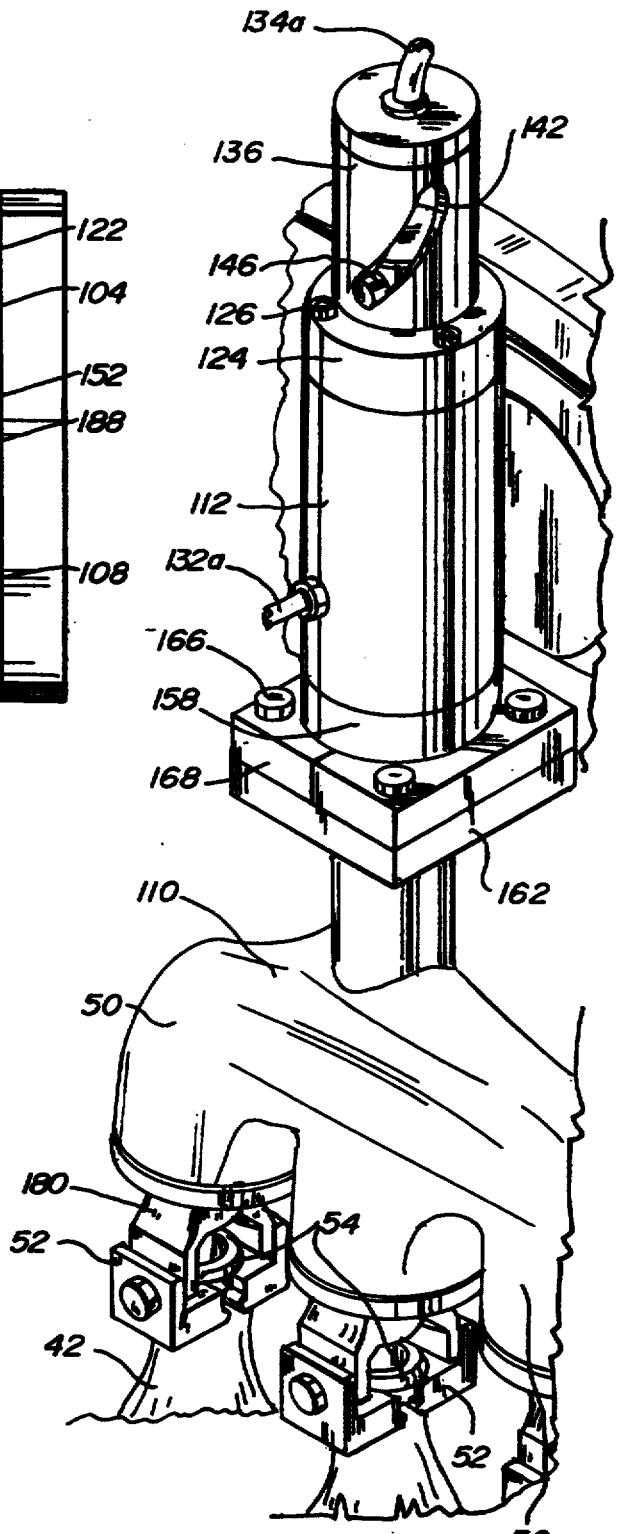
Fig_5   Fig_4

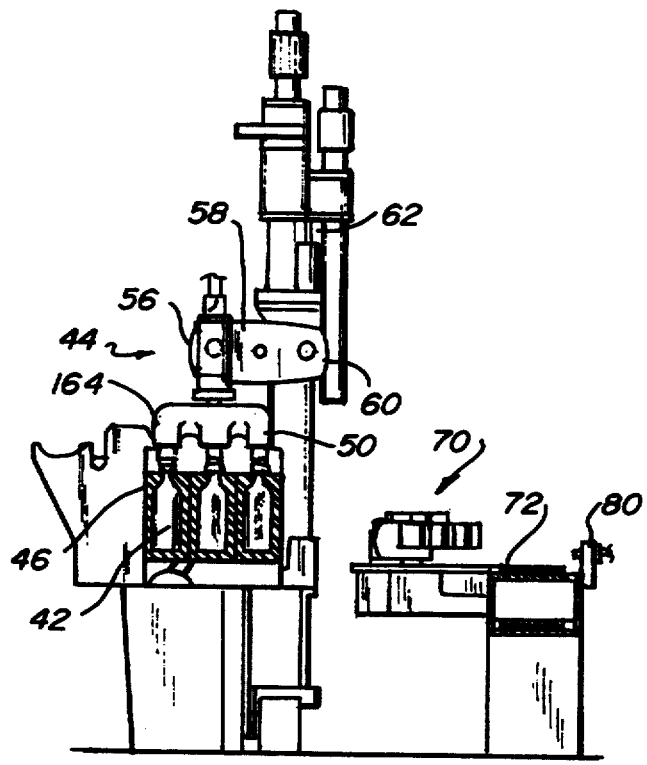
Fig_6
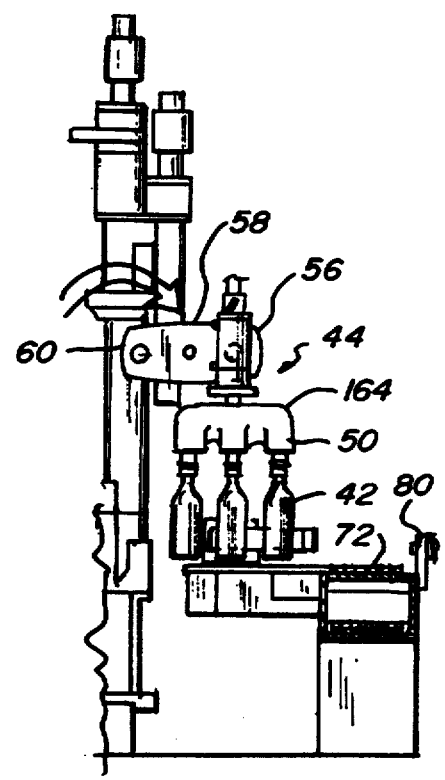
Fig_7
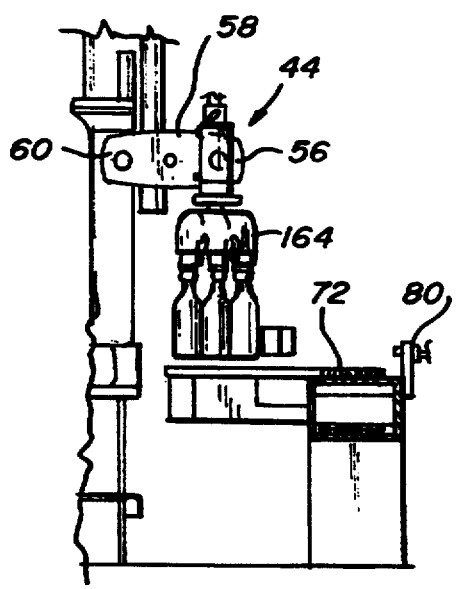
Fig_8
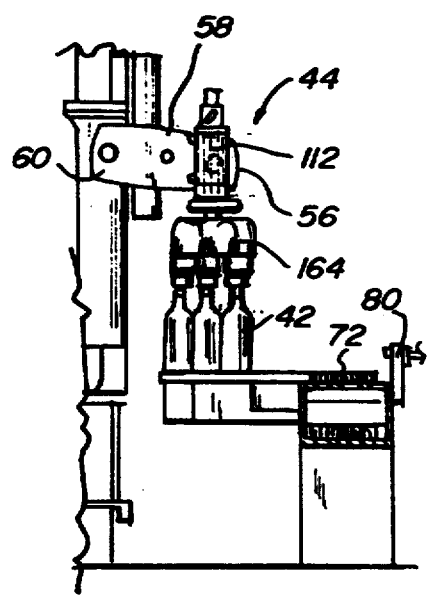
Fig_9

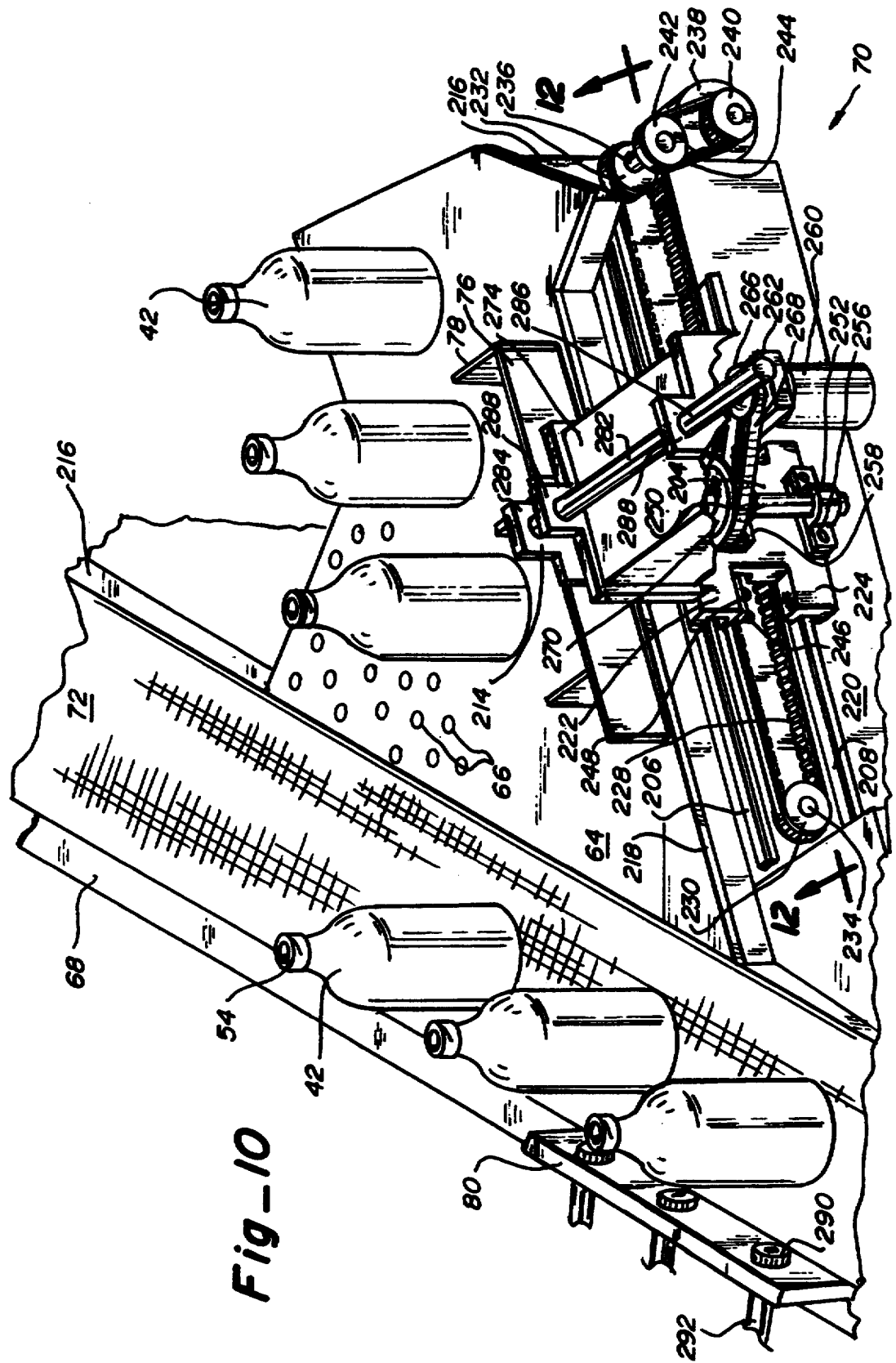
Fig_10

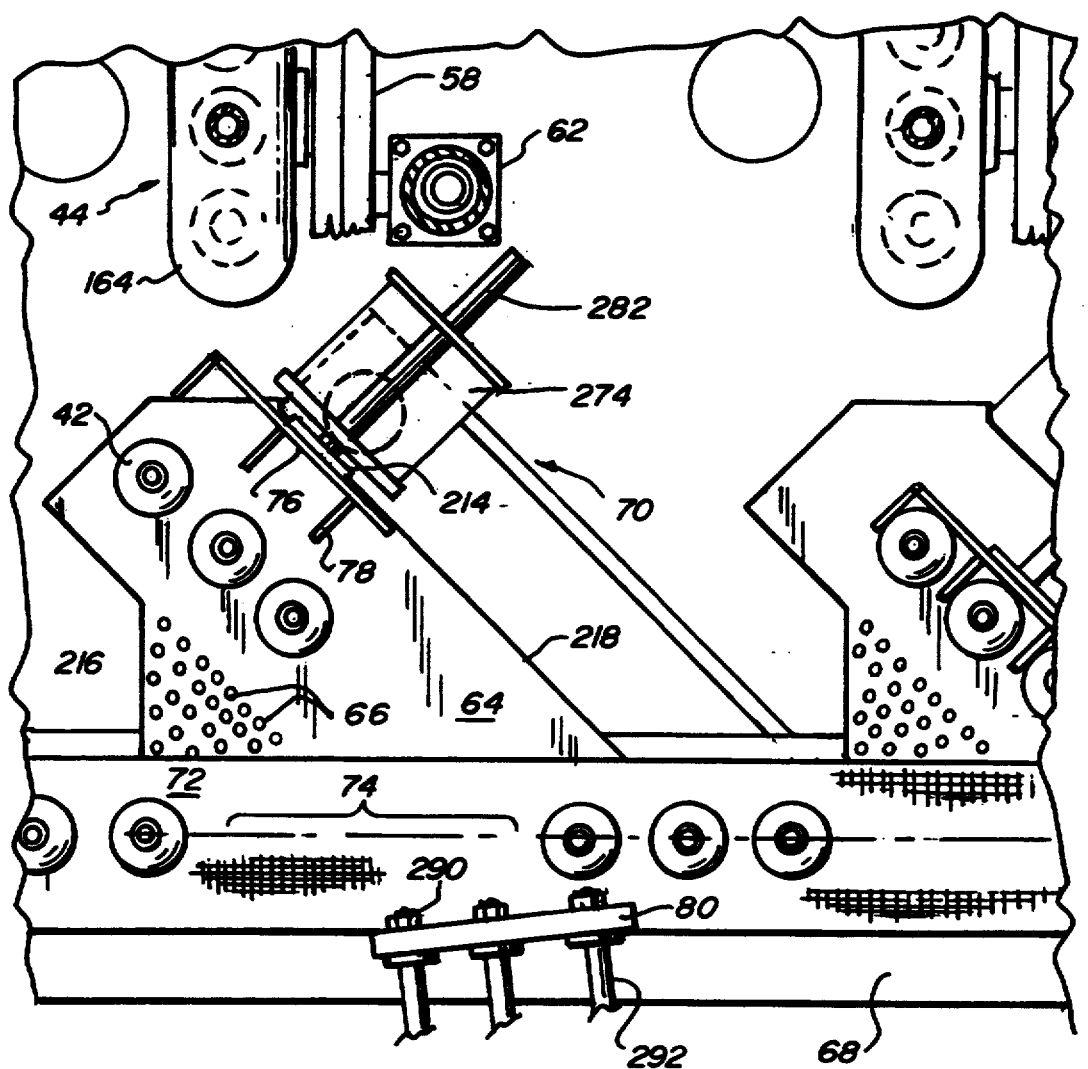
Fig_11

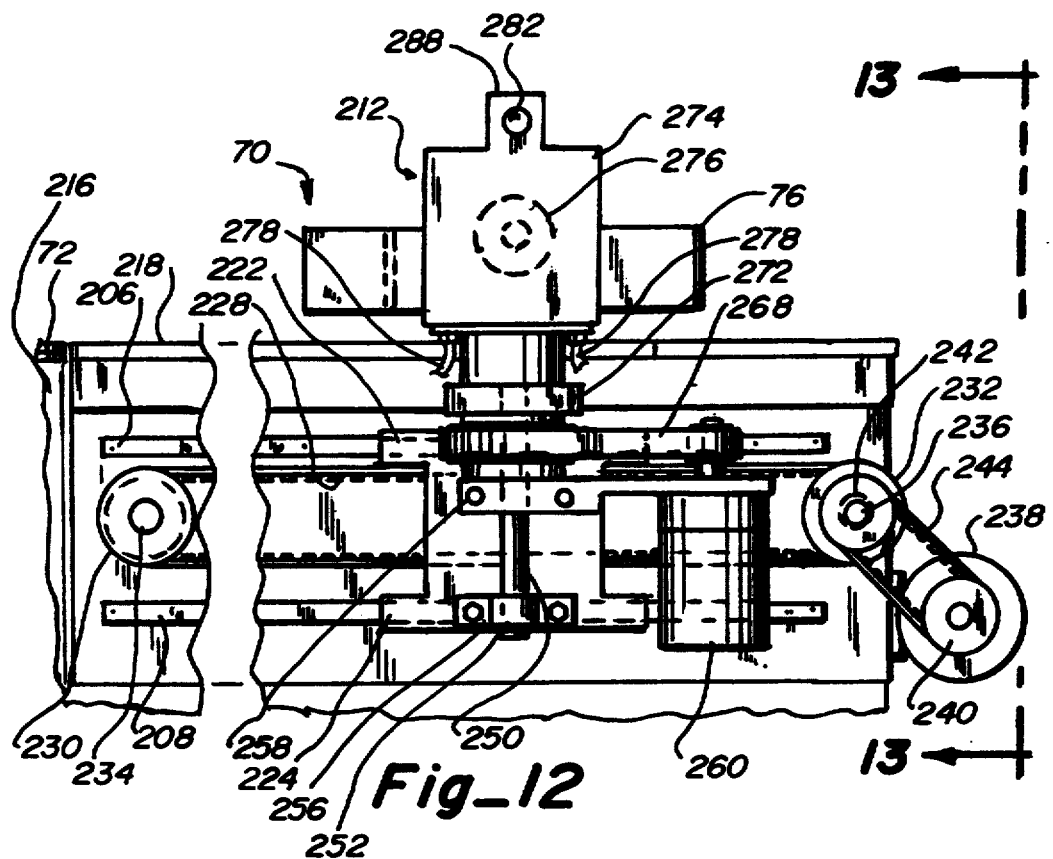
Fig_12
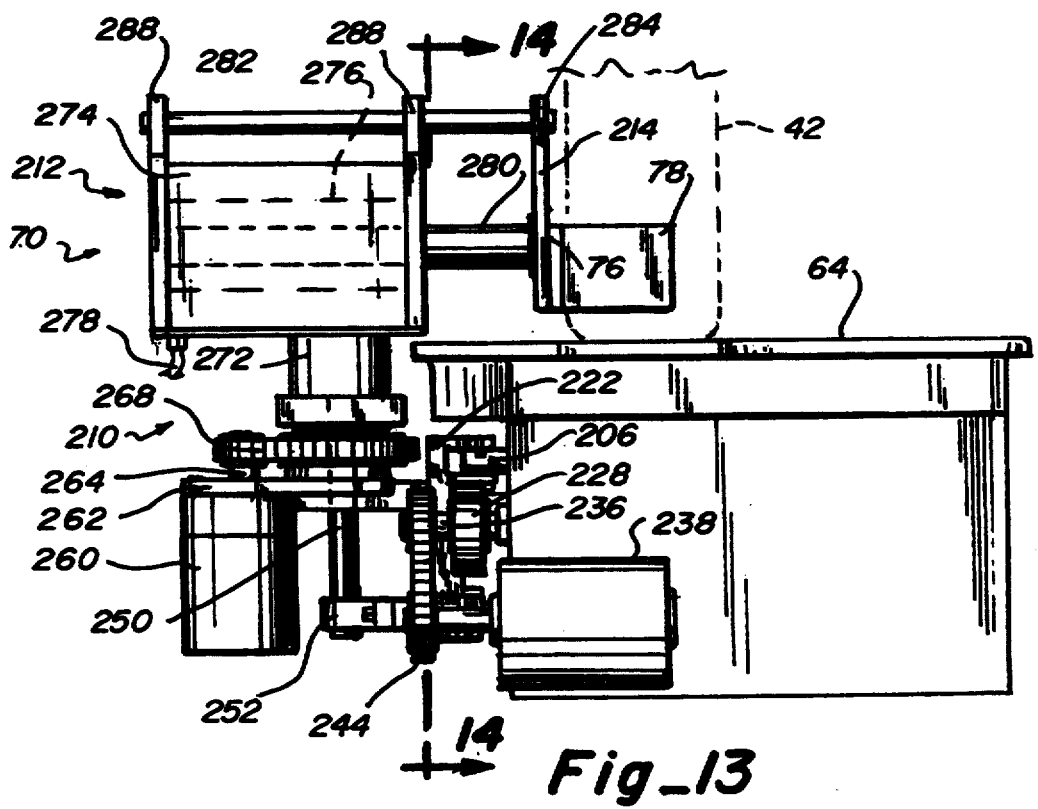
Fig_13

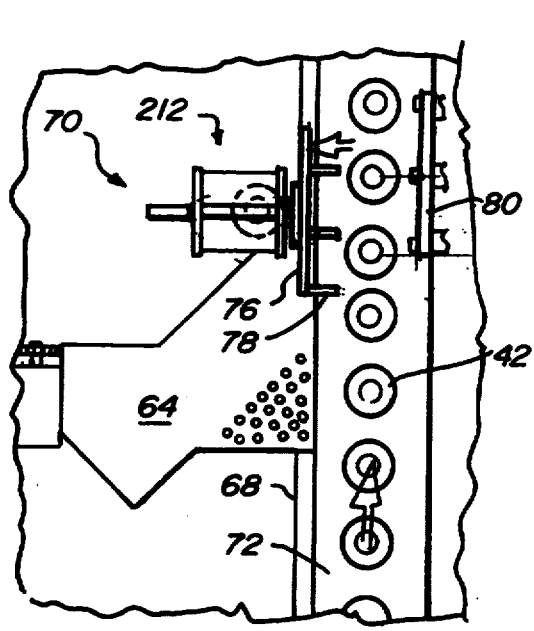
Fig_20
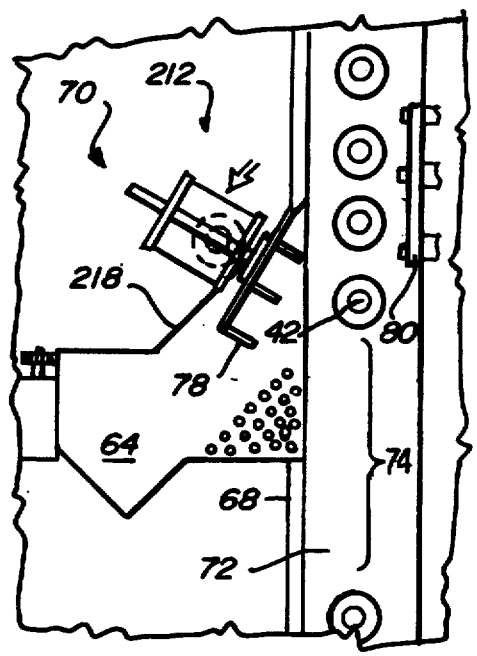
Fig_21
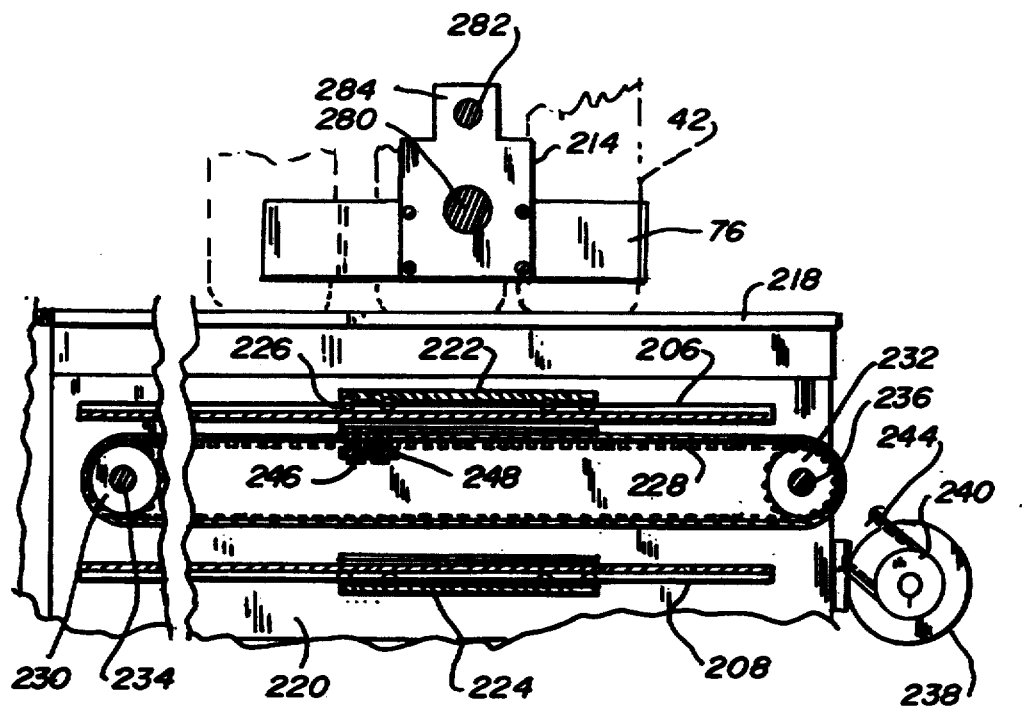
Fig_14

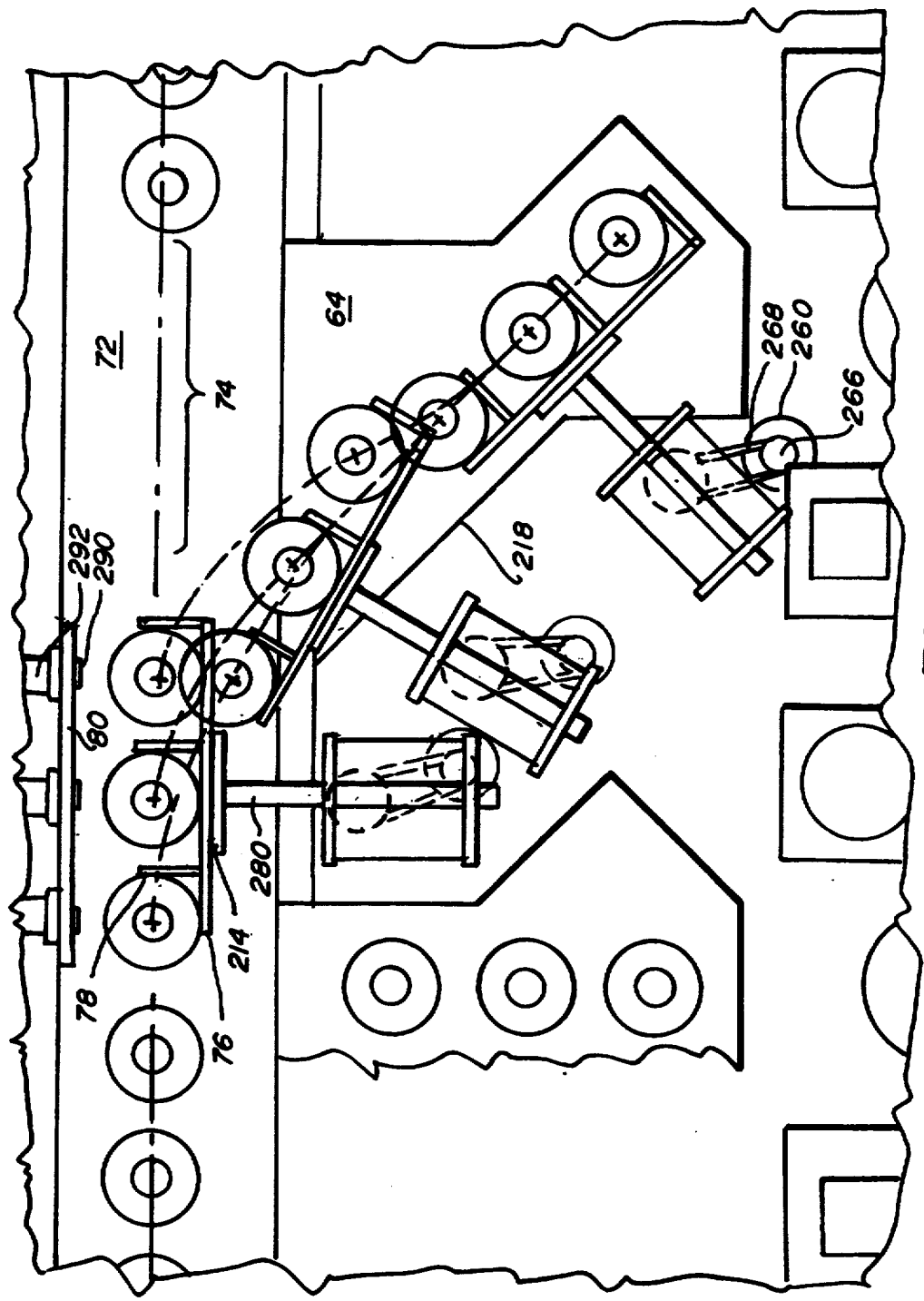
Fig_15

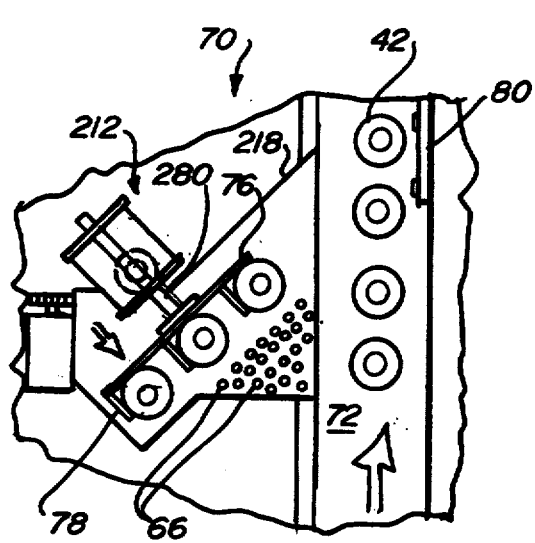
Fig_16
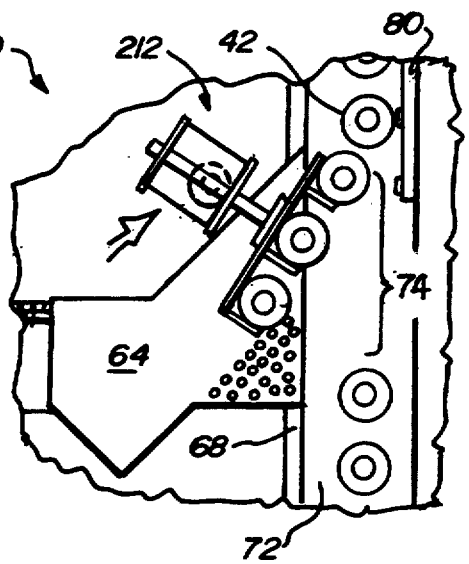
Fig_17
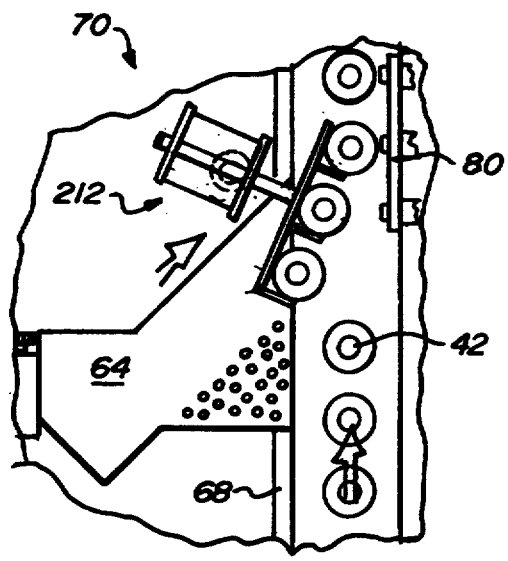
Fig_18
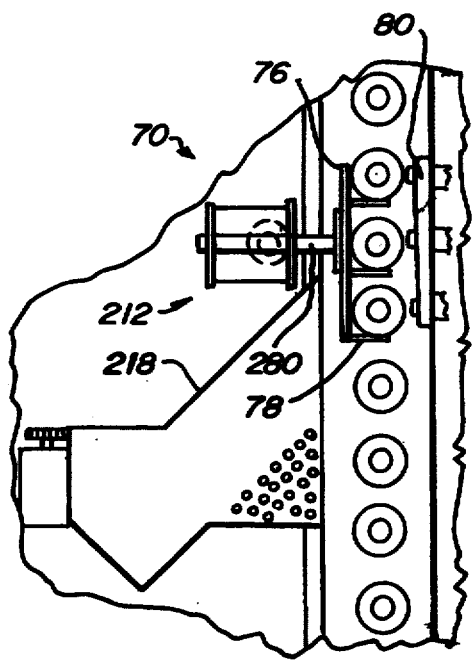
Fig_19

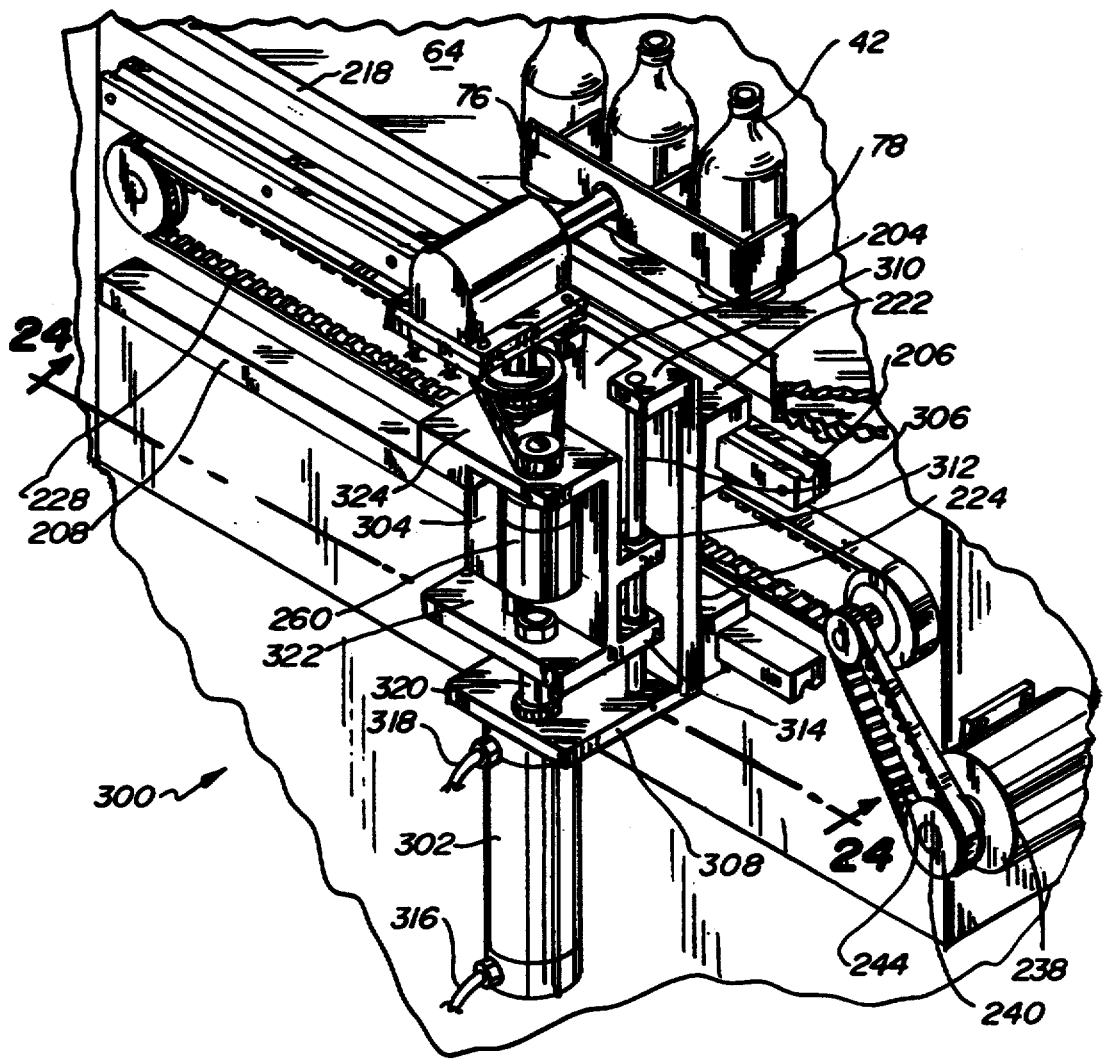
Fig_23

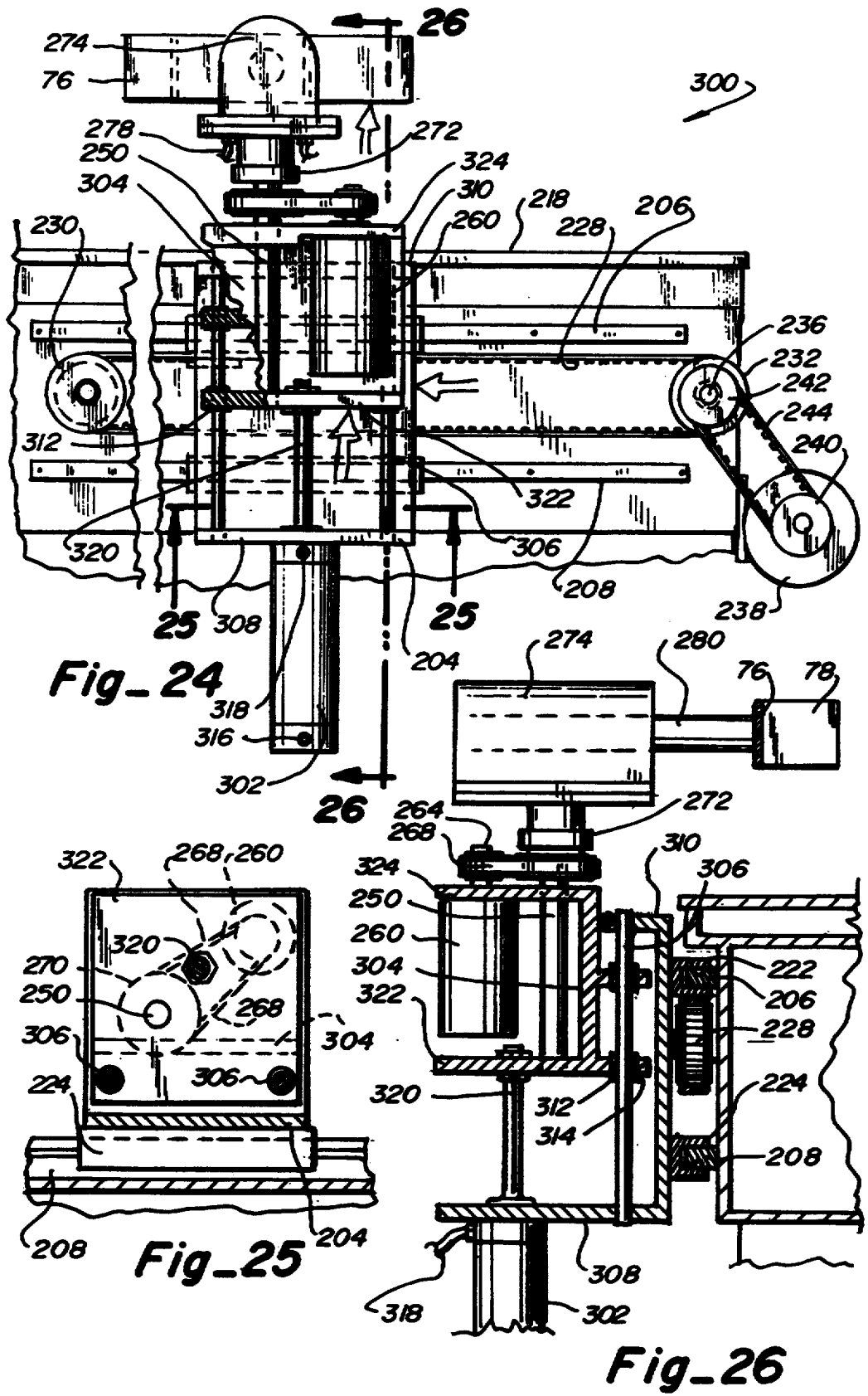

& nbsp;
APPARATUS FOR TRANSFERRING GLASS ARTICLES FROM AN IS TO A HIGH SPEED TRANSFER CONVEYOR This invention relates to the manufacture and production of glass articles, such as bottles, jars and the like (hereinafter referred to as "bottles"), and more particularly to a new and improved technique for more rapidly and effectively transferring the glass articles from individual sections of a glassware forming machine onto a rapidly moving transfer conveyor.

BACKGROUND OF THE INVENTION

Glass articles, such as bottles and jars but herein exemplified by bottles, are typically mass produced in a glassware forming machine. A glassware forming machine is formed by combining or integrating a plurality of individual sections. Each individual section (IS or Section) is capable of producing one to four bottles simultaneously from a similar number of gobs of molten glass. By combining a relatively large number of Sections in a single glassware forming machine, a relatively high capacity for bottle production capacity is achieved. Furthermore, the operation of each Section is coordinated with all of the Sections so that the glassware forming machine achieves an unrestricted production output equal to the cumulative total of the individual capacities of all of the Sections.

One approach to increasing efficiency and profitability in the glass forming industry is to increase bottle production rates. Increasing the manufacturing capacity may be achieved by increasing the number of Sections of a single glassware forming machine. However, substantially increasing the number of Sections may result in a practical problem of difficulty in removing or transporting the bottles away from the glassware forming machine at the same high rate that all of the Sections are capable of producing bottles. If the bottles cannot be removed as fast as the Sections make them, the overall capacity of the glassware forming machine will be diminished and the desired increase in production from combining a larger number of Sections will be lost.

In a conventional IS, a take-out mechanism removes the bottles from a blow mold after they have been formed into the final desired shape and deposits the bottles on a dead plate. A pusher mechanism then moves the bottles from the dead plate onto an adjacent, fast-moving transfer conveyor which removes the still-hot, but fully-formed, bottles to an annealing Lehr, for further treatment to complete the bottle-making procedure. The transfer conveyor typically removes the bottles from the glassware forming machine in a single line in single file so that a transfer wheel can align the bottles and the bottles can be pushed in single bottle rows into the annealing furnace.

The transfer conveyor moves at essentially a right angle to the direction in which the take-out mechanism removes the bottles from the blow molds. The pusher mechanism must therefore alter the orientation of the aligned bottles by ninety degrees while transferring the bottles to empty spaces or "windows" unoccupied by other bottles on the transfer conveyor. The pusher mechanism should also accelerate the bottles to approximately the linear speed of the transfer conveyor so the bottles will remain upright on the conveyor without tipping when they are deposited on the transfer conveyor.

A conventional pusher mechanism typically accomplishes these functions with a rotary motion. The bottles are moved along an arcuate path to change their orientation by the ninety degrees and align their orientation parallel to the transfer conveyor while simultaneously accelerating the bottles along the arcuate path so they achieve a linear speed approximately equal to the speed of the conveyor at the end of the arcuate movement. With this acceleration, the linear velocity of the bottles in the direction of the conveyor approximately matches the speed of the conveyor. By matching the linear velocity of the transferred bottles to the speed of the conveyor, there is little or no relative motion between the bottles and the conveyor when they are delivered to the conveyor. Consequently no significant instabilities are introduced. Instabilities could cause tipping and subsequent destruction of the bottles or misalignment of bottles on the conveyor, or could cause the bottles to contact one another (which would likely create defects within the bottles due to their high temperature).

Although prior art rotary pusher mechanisms are adequate for use with many conventional glassware forming machines, they have proved problematic in glassware forming machines having a relatively large number of Sections operating at full capacity. The problems arise because a higher speed transfer conveyor is needed to remove the increased number of bottles formed by the higher capacity glassware forming machine. The greater speed of the conveyor requires the pusher mechanism to rotate with a greater angular velocity to accelerate the bottles to a speed which will match the speed of the conveyor at the end of the arcuate movement. At the higher angular velocity, the centrifugal force acting on the bottles, which increases by the square of the increase in angular velocity, creates unacceptable instabilities which tend to throw the bottles out of contact with the pusher mechanism, throw the bottles off of the conveyor, tip the bottles, position the bottles out of alignment on the conveyor, or the like. Reducing the angular velocity of the prior art rotary pusher to limit the amount of centrifugal force causes an unacceptable mismatch in the linear speed the bottles and the speed of the conveyor, and this mismatch in speed could be sufficiently destabilizing to cause the bottles to tip, to contact other bottles to be out of alignment on the conveyor, or the like. Of course, reducing the angular velocity of the prior art rotary pusher mechanism may also have the undesirable effect of slowing the operating speed of the IS, thus reducing the output capacity of the glassware forming machine.

Consequently, the limitations of prior art rotary pusher mechanisms have practically limited the output capacity of glassware forming machines to approximately their current levels. It is with respect to the prior art rotary pusher mechanisms' practical restrictions on the further increase in capacity of glassware forming machines, as well as other considerations not specifically discussed in this abbreviated background, that the present invention has evolved.

SUMMARY OF THE INVENTION

The objectives of the present invention include increasing the speed at which the pusher mechanism of an IS can transfer bottles onto a moving transfer conveyor belt, overcoming the present limitation on the number of bottles which may be produced by multiple Sections of a single glassware forming machine without restricting the glass bottle forming capacity of each IS due to an inability to effectively transfer the bottles onto the transfer conveyor belt, and generally overcoming some of the deficiencies associated with previous pusher and take-out mechanisms.

In accordance with these and other objectives, one feature of the present invention relates to a new and improved pusher mechanism for transferring a plurality of glass bottles onto a transfer conveyor belt after the bottles have been formed in a blow mold of an IS and deposited on a dead plate adjacent to the transfer conveyor. The pusher mechanism includes an bottle contact assembly adapted for contacting the bottles while supported on the dead plate and pushing the bottles from the dead plate to the transfer conveyor belt, a pivotable assembly connected to the bottle contact assembly for rotating the contacted bottles through an arc to align the bottles with the conveyor belt, and a carriage assembly for linearly moving the pivotable assembly at a converging acute angle toward the conveyor belt.

The linear movement of the carriage assembly combined with the rotational movement of the pivotable assembly effectively lengthens the radius of curvature of the path of the bottles between their initial position on the dead plate and their aligned position on the conveyor belt, compared to the arc of the purely rotational movement of the pivotable assembly. The lengthened radius of curvature of the path of the bottles reduces the required angular velocity and hence the amount of centrifugal force applied to the bottles. As a result the bottles may be moved more quickly onto a faster moving conveyor belt. Also, the linear motion of the carrier assembly and the rotation of the pivotable assembly combine to reduce or limit the angular velocity of the bottles compared to prior art rotary pushers. Lastly, the greater rate of movement of the bottles onto the conveyor is achieved both the rotation of the pivotable assembly and the linear motion of the carrier assembly, and these combined movements substantially equal the rate of movement of the conveyor belt. Accordingly the bottles are transferred onto the moving conveyor belt at a faster rate while limiting the forces that would introduce sufficient instabilities to prevent an effective transfer of the bottles.

Another feature of the present invention relates to employing, as part of the bottle contact assembly, an extension device for extending a pusher member along a path which is generally radially oriented with respect to the rotational movement of the pivotable assembly in order to contact the bottles. The extension movement may also be employed along with the linear movement of the carriage assembly and the rotational movement of the pivotable assembly to further control the path of the bottles.

Another feature of the present invention relates to incorporating a lifting assembly operative for lifting the bottle contacting assembly in a vertical movement out of contact with the bottles. The vertical movement of the bottle contacting assembly above the bottles avoids contact with the other bottles on the conveyor, among other things.

An additional feature of the present invention relates to a new and improved take-out mechanism which may be advantageously employed in combination with the pusher mechanism. The take-out mechanism includes a tong head assembly which has a plurality of tong heads, and each tong head has tongs for gripping and releasing a bottle. A translation device translates the tong head assembly in a linear path between the blow mold and the dead plate, with the tongs gripping the bottles at the molds and releasing the bottles on the dead plate. Prior to releasing the bottles on to the dead plate, the tong head assembly rotates the tong heads to position the bottles on the dead plate in an alignment which forms an acute angle with both the transfer conveyor and the alignment of the bottles in the blow mold. The take-out mechanism thereby contributes to the more effective manner by which the bottles are transferred to the conveyor belt by establishing the initial acute angle so the pusher mechanism need only rotate the bottles the remaining complementary acute angle during transfer to the conveyor.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is perspective illustration of four Sections of an integrated glassware forming machine showing take-out mechanisms and pusher mechanisms which incorporate the present invention and also showing a transfer conveyor for removing bottles from the glassware forming machine.

FIG. 2 is a side elevational view of a portion of an IS shown in FIG. 1, primarily illustrating a take-out mechanism with a portion broken away to show internal details.

FIG. 3 is a partial section view taken substantially in the plane of line 3—3 in FIG. 2.

FIG. 4 is an enlarged perspective view of a tong head assembly of the take-out mechanism illustrated in FIG. 2.

FIG. 5 is an enlarged sectional view taken substantially in the plane of line 5—5 in FIG. 2.

FIGS. 6 to 9 are illustrations showing the sequence in operation of the take-out mechanism shown in FIGS. 1, 2, 3, 4 and 5 when removing the bottles from blow molds of the IS and orienting them at an acute angle prior to the pusher mechanism transferring the bottles onto the transfer conveyor.

FIG. 10 is a perspective view of the pusher mechanism shown in FIG. 1, shown in relationship to the bottles positioned at the acute angle to the transfer conveyor by the take-out mechanism.

FIG. 11 is a top plan view of the pusher mechanism shown in FIG. 10, the transfer conveyor, the bottles on a dead plate of the IS, a portion of the take-out mechanism and a portion of an adjacent IS.

FIG. 12 is a side view of the pusher mechanism illustrated in FIGS. 10 and 11 as viewed from the plane of line 12—12 in FIG. 10.

FIG. 13 is an end view of the pusher mechanism illustrated in FIGS. 10 and 11 as viewed from the plane of line 13—13 in FIG. 12.

FIG. 14 is a sectional view taken substantially in the plane of line 14—14 of FIG. 13.

FIG. 15 is a schematic view similar to FIG. 11 showing the movements of the pusher mechanism illustrated at three separate points during a typical push-out cycle and illustrating with dashed lines the path of the bottles during the push-out cycle.

FIGS. 16 to 21 are illustrations showing the sequence in operation of the pusher mechanism shown in FIGS. 10 to 15, during a push-out cycle.

FIG. 23 is a perspective illustration showing another embodiment of the pusher mechanism of the present invention, as an alternative to that embodiment shown in FIG. 10.

FIG. 24 is a side view of the pusher mechanism shown in FIG. 23 as viewed from the perspective of line 24—24 in FIG. 23.

FIG. 25 is a sectional view taken substantially in the plane of line 25—25 in FIG. 24.

FIG. 26 is a sectional view taken substantially in the plane of line 26—26 in FIG. 24.

DETAILED DESCRIPTION OF PREFERRED EMBODIMENTS

Figure 22:
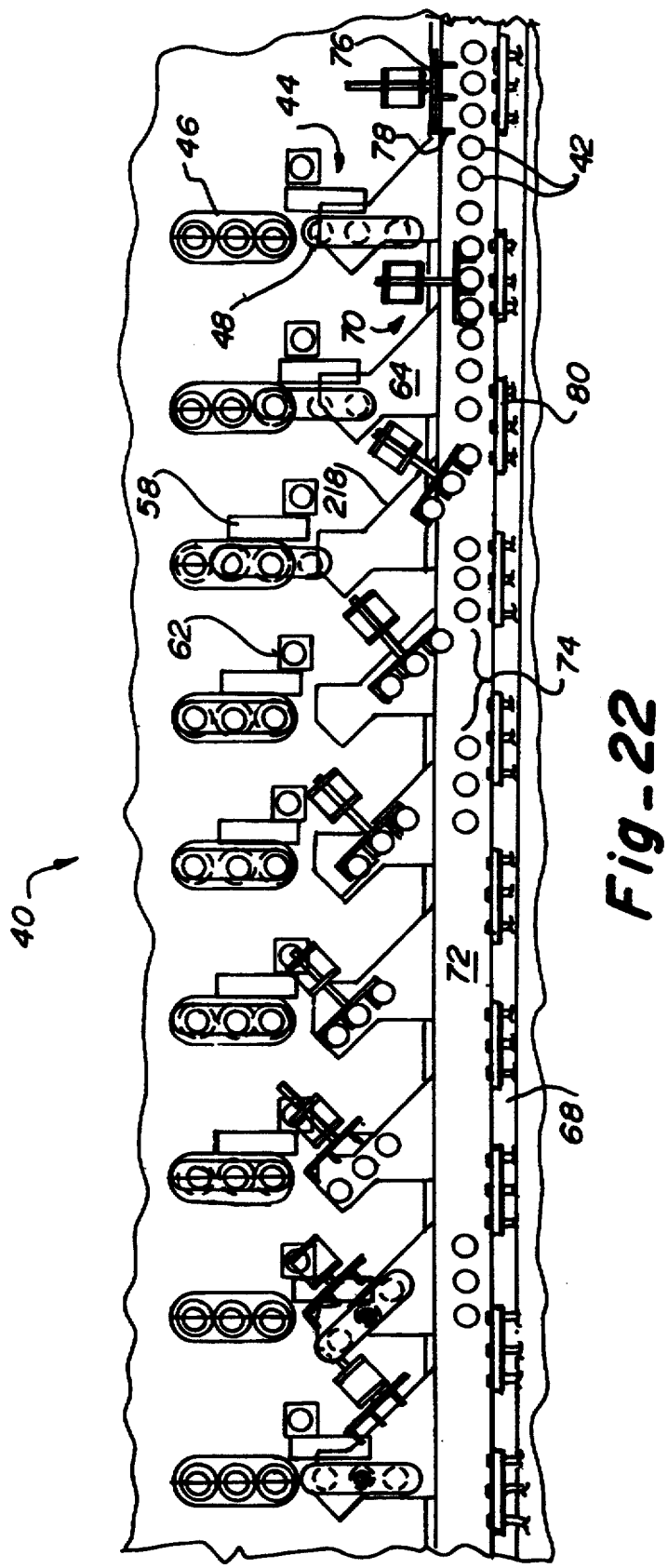
FIG. 22 is a schematic top view of a plurality of Sections of a glassware forming machine such as that shown in FIG. 1, illustrating the coordinated operation of the take-out and pusher mechanisms of each IS in transferring bottles to the transfer conveyor.

The features of the present invention are embodied in one presently preferred form, in four triple-gob Sections 40a, 40b, 40c and 40d of a glassware forming machine 40, which is partially shown in FIG. 1. Each IS 40a, 40b, 40c and 40d is identical and all the Sections operate in coordination with one another under the control of conventional timing and synchronization devices (not shown) to bottles 42. It is intended that the glassware forming machine 40 offer a relatively high bottle-making capacity. For example, the present invention may be advantageously used in a glassware forming machine having sixteen triple gob Sections. However, the present invention may be advantageously incorporated in glassware forming machines having any number of Sections.

A take-out mechanism 44 of each IS 40a, 40b, 40c and 40d removes the three newly formed bottles 42 from a conventional blow mold 46 upon separation of the halves of the mold. The take-out mechanism 44 includes a tong head assembly 48 from which three separate tong heads 50 extend. Tongs 52 of each tong head 50 grip each bottle 42 by its finish portion 54, which refers to the neck and mouth portion of the bottle 42. The tong head assembly 48 is pivotably connected to an outer end 56 of a take-out arm 58, and the other inner end 60 of the take-out arm 58 is pivotably connected to a fixed vertical column 62 of the take-out mechanism 44. The take-out mechanism 44 rotates the take-out arm 58 about its inner end 60, and during rotation of the take-out arm 58, the tong head assembly 48 maintains the bottles 42 in a consistent vertical orientation. The bottles are lifted out of the separated halves of the blow mold 46 and are carried forward by the rotation of the take-out arm 58. After the take-out arm 58 rotates through an angle of approximately 180 degrees, the bottles 42 are suspended a slight distance above a dead plate 64 of each IS. Cooling air is blown upward from holes 66 in the dead plate 64 to cool the bottles which are still hot and somewhat flexible. The air cools the bottles, thereby making them less susceptible to deformation. The foregoing operation is conventional in the take-out mechanism of the IS.

One of the improvements of the present invention, associated with the take-out mechanism 44, rotates the bottles suspended by the tong head assembly 48 through an acute angle, for example 45 degrees (FIG. 8), while the bottles are suspended over the dead plate 64. After the bottles 42 have cooled sufficiently, the take-out arm 58 rotates slightly further about its inner end 60 to lower the bottles 42 onto the dead plate 64. The tong head 50 separates the tongs 52 to release the grip on the bottles as they are lowered onto the dead plate 64 (FIG. 9). The bottles 42 are thus positioned in a line on the dead plate 64 at the acute angle established by the position of the tong heads 50 when the bottles are released. In this position, the bottles 42 are adjacent to a transfer conveyor 68. The transfer conveyor removes the bottles from the individual sections of the glassware forming machine and transports the bottles on for further treatment, such as annealing.

After the bottles are deposited on the dead plate, the tong heads 50 rotate back in alignment with the three bottles formed in the blow mold 46. The take-out arm 58 rotates about its inner end 60 to position the tong heads 50 over the next three bottles in the blow molds, and the tongs 52 grip the finish portions 54 of those bottles to carry them forward and rotate them through the acute angle before depositing them on the dead plate 64. The take-out cycle thus continually repeats itself.

After one group of three bottles is deposited on the dead plate, a pusher mechanism 70 moves the bottles onto a belt 72 of the adjacent transfer conveyor 68. Because the transfer conveyor 68 must remove a considerable number of bottles from a relatively high capacity glassware forming machine 40 than was previously required, the belt 72 is moving relatively fast. The pusher mechanism 70 operates in coordination and synchronization with the take-out mechanism 44 to transfer the bottles deposited from one take-out cycle to the conveyor 68 prior to the bottles from the next take-out cycle being deposited on the dead plate 64.

The pusher mechanism 70 preferably moves the bottles linearly along a path parallel to the acute angle of the bottles deposited on the dead plate while simultaneously rotating the bottles during a push-out cycle to position the bottles into open spaces 74 or windows on the conveyor belt 72. The combination of linear and rotational movement of the pusher mechanism 70 during a push-out cycle achieves a number of improvements. At the commencement of a push-out cycle, a contact plate 76 with fingers 78 extending therefrom first moves linearly into engagement with the bottles 42, as shown in FIG. 16. The pusher mechanism 70 commences a linear acceleration along a path generally parallel to the orientation of the bottles at the acute angle to slide the bottles 42 linearly along the dead plate 64 toward the conveyor belt 72. At some point in the linear motion, as shown in FIG. 17, the pusher mechanism 70 commences rotational motion to rotate the line of bottles 42 prior to inserting the bottles 42 into an open space 74 on the conveyor belt 72 which is unoccupied by other bottles. Further linear and rotational movement brings the bottles 42 fully onto the conveyor belt 72, as shown in FIG. 18. Rotation continues once the bottles 42 are on the belt 72 until the bottles 42 are aligned in single-file order in alignment with the other bottles on the conveyor belt 72, as shown in FIG. 19. Immediately thereafter, the contact plate 76 and the fingers 78 retract away from the bottles just deposited on the conveyor belt 72 to avoid contact with other bottles, as shown in FIG. 20. The pusher mechanism 70 rotates and moves linearly to return to an initial position for the start of the next push-out cycle, as shown in FIG. 21. The pusher mechanism 70 is thus in position to transfer another set of bottles 42, deposited by the take-out mechanism 44, to the conveyor belt 72 in the next push-out cycle.

The combined linear and rotational movement of the pusher mechanism 70 quickly accelerates the bottles 42 onto the conveyor belt 72, thereby closely matching the linear speed of the bottles to the linear speed of the conveyor belt to prevent instabilities. Further, the rotational movement of the pusher mechanism 70, combined with the initial acute angular orientation of the bottles relative to the conveyor belt 72 and the linear movement of the pusher mechanism 70, is capable of limiting angular velocities and centrifugal forces on the bottles to magnitudes comparable to those produced by conventional rotary pushers. Thus, even though it is necessary to accelerate the bottles to a greater extent due to the higher speeds of the conveyor belt 72, the bottles are subjected to essentially comparable centrifugal and other forces when they are deposited on the faster moving conveyor belt 72.

If desired, in order to help prevent the bottles 42 from tipping laterally under the influence of the centrifugal force of rotation, a blower block 80 may direct a pulse of air at each of the bottles 42 as it rotates onto the conveyor (FIGS. 15 and 19). The pulse of air stabilizes the bottles by counteracting some of the centrifugal force to help prevent the bottles from tipping over or sliding off the conveyor belt 72. Although the air pulses stabilize the bottles 42, the added stability may not be required.

The transfer of the bottles 42 from their blow mold 46 to the transfer conveyor belt 72 is enhanced by the use of the take-out mechanism 44 and the pusher mechanism 70 of the present invention. The rotatable tong heads 50 pivot the bottles 42 to the acute angle prior to setting the bottles 42 on the dead plate 64. The pusher mechanism 70 then slides the bottles 42 toward the conveyor belt 72 while pivoting the bottles to align the bottles 42 with the direction of movement of the conveyor belt 72. This combination of linear and rotational movement reduces the angular velocity and centrifugal force on the bottles 42 as the bottles are propelled onto the conveyor belt 72. The two mechanisms 44 and 70, used together, are capable of transferring bottles 42 to relatively fast moving conveyor belts 72.

The mechanical and operational details of the take-out mechanism 44 are described in greater detail in conjunction with FIGS. 2 to 9. The rotation of the take-out arm 58 is best understood by reference to FIGS. 2 and 3. The inner end 60 of the take-out arm 58 rotates about a fixed shaft 82 which extends from a fixed vertical column 62 of the IS. An annular collar 84 extends rearwardly from a housing 86 of the take-out arm 58 and is connected to a driven gear 88. The driven gear 88 is connected to the collar 84 so that the driven gear 88, collar 84 and housing 86 of the take-out arm 58 rotate together about the fixed shaft 82. The driven gear 88 is rotated by a rack 92 located within the vertical column 62. The rack is retained for linear movement by conventional means (not shown) located in the column 62. The teeth of the rack 92 mesh with the teeth of the driven gear 88. The rack 92 is driven in linear movement by a pneumatic piston (not shown) also near the bottom of the column 62 where it attaches to the frame of the IS. The linear movement of the rack 92 rotates the driven gear 88 and the attached take-out arm 58 through an arc slightly greater than 180 degrees, as shown in FIGS. 6, 7 and 9. By controlling the position of the piston and the connected rack 92, the degree of rotation and the rotational position of the take-out arm 58 is controlled in a corresponding manner. Although not shown in FIG. 2, another rack 93 (FIG. 3) is connected to the gear 88 on the opposite side of the rack 92. This other rack, which is conventional, is connected to impact a shock absorber (not shown) to decelerate the rotational movement of the take-out arm.

The rotation of the tong head assembly 48 about a horizontal axis to maintain the consistent orientation of the tong head assembly 48 and bottles 42 is shown in FIGS. 2 to 7. The housing 86 of the take-out arm 58 is hollow and within it at its inner end 60, a fixed gear 96 is fixed on the stationary shaft 82. An intermediate gear 100 is rotatably mounted on a shaft 102 fixed within the housing 86. The teeth of the intermediate gear 100 mesh with the teeth of the fixed gear 96 so that the intermediate gear 100 rotates about the shaft 102 and the fixed gear 96 as the take-out arm rotates about its inner end 60. A tong head gear 104 is fixedly attached to a shaft 106 rotatably mounted within the housing 86 at the outer end 56 of the take-out arm 58. The tong head gear 104 also meshes with the intermediate gear 100 and thus rotates when the intermediate gear 100 rotates upon rotation of the take-out arm 58 about its inner end 60. The shaft 106 extends to the outside of the housing 86 where it is connected to the tong head assembly 48. A flange 108 of the tong head assembly 48 is attached to the shaft 106 so that the assembly 48 rotates with the shaft 106.

The fixed gear 96 and the tong head gear 104 are exactly the same size so that as the intermediate gear 100 is rotated by rotation of the take-out arm, the tong head gear 104 will rotate the same amount as the take-out arm 58 but in the relative opposite direction. As the take-out arm 58 rotates about the fixed shaft 82, the shaft 106 will rotate an equal amount in the opposite direction relative to the rotation of the take-out arm 58. Therefore, the tong head assembly 48 rotates about the take-out arm 58 as the take-out arm 58 rotates about the fixed shaft 82. In this manner, the tong head assembly 48 is always in a consistent vertical orientation during rotation of the take-out arm 58.

The mechanism for rotating a tong head housing 110 containing the tong heads 50 about a vertical axis to position the bottles 42 at the acute angle relative to the conveyor belt 72 is shown in FIGS. 2 to 5. The flange 108 connected to the shaft 106 (FIG. 3) extends from a cylinder housing 112 of the tong head assembly 48. The cylinder housing 112 has a hollow interior 114 which is defined by an upper cylinder 116 and a lower annular opening 118. A piston 120 is located within the cylinder 116, and seals 122 establish a substantially air tight seal between the piston 120 and the cylinder 116. A cap member 124 is attached by bolts 126 to the upper end of the cylinder housing 112 to terminate the cylinder 116 at its upper end. Air delivery ports 128 and 130 are formed in the cylinder housing 112 and in the cap member 124, respectively, at positions below and above the location of the piston 120, respectively.

The ports 128 and 130 conduct pressurized air into and out of the cylinder 116 through tubes 132a and 134a, respectively. As is shown in FIG. 3, the tubes 132a and 134a connect with passages 132b and 134b, respectively, formed in the flange 108 of the cylinder housing 112. Passages 132c and 134c continue through the shaft 106 and connect with tubes 132d and 134d, respectively, at annular grooves formed in the housing 86 of the take-out arm 58 surrounding the ends of the passages 132c and 134c. The tubes 132d and 134d extend from the outer end 56 to the inner end 60 of the take-out arm 58. Annular grooves are formed in the collar 84 to respectively connect the tubes 132d and 134d to passages 132e and 134e formed in the shaft 82. The passages 132e and 134e communicate through annular grooves in the fixed vertical column to ports 132f and 134f, respectively, where the pressurized air is applied and relieved. In this manner the pressurized air may be applied to alternately raise and lower the piston 120 in a vertical movement in the cylinder 116, regardless of the rotational position of the take-out arm.

The cap member 124 includes an annular sleeve portion 136 extending upward above the cylinder housing 112. A cylindrical end portion 138 of the piston 120 extends upward through a cylindrical opening 140 defined by the annular sleeve portion 136 of the cap member 124. A helical cam slot 142 is formed through the annular sleeve portion 136. Seals 144 between the cap member 124 and the cylindrical end portion 138 of the piston 120 prevent pressurized air from leaking from the cylinder 116 around the end portion 138 of the piston 120. A follower pin 146 is attached to the end portion 138 of the piston 120 and is positioned within the helical cam slot 142.

As the piston 120 is raised and lowered by the application of pressurized air through the ports 128 and 130, the follower pin 146 moves within the helical cam slot 142 and causes the piston 120 to rotate within the cylinder 116. The dimensions of the helical cam slot 142 cause the piston 120 to rotate, for example approximately 45 degrees, as the follower pin 146 moves between the vertical limits of the helical cam slot 142. The location of the helical slot 142 and the follower pin 146 position the three tong heads 50 of the tong head assembly 48 in parallel alignment with the position of the three bottles 42 in the blow mold 46 (FIG. 1) when the piston 120 is in its lowermost position. The amount of rotation of the follower pin 146 within the helical cam slot 142 determines the desired degree of rotation of the tong heads 50. The tong heads 50 rotate to position the bottles at the acute angle relative to the conveyor 68 when the piston 120 is in its uppermost position.

A hollow interior 148 of the piston 120 is splined to a correspondingly shaped end 150 of a tong head shaft 152 which extends downward through the lower annular opening 118. The splined connection of the piston 120 and the shaft 152 allows the piston 120 to move vertically relative to the shaft 152, but the splined connection causes the shaft 152 to rotate in unison with the piston 120 as the piston moves vertically within the cylinder 116. An annular flange 154 supports the shaft 152 on a thrust bearing 156 which is supported by a bearing mount 158 fixed to the bottom of the cylinder housing 112. The bearing 156 allows the shaft 152 to rotate within the cylinder housing 112.

The tong head shaft 152 extends below the cylinder housing 112 and terminates in a square flange 160. A top plate 162 of the tong head housing 110 of the tong head assembly 48 is attached by bolts 166 to two half plates 168. The square flange 160 is sandwiched between the top plate 162 and the half plates 168 so that vertical movement of the piston 120 causes the follower pin 146 to move within the helical slot 142 and rotate the piston 120, the shaft 152 and the attached tong head housing 110.

The manner by which the tongs 52 of the tong heads 50 of the tong head housing 110 grip the finish portion 54 of the bottles is understood from FIGS. 3 to 5. Each tong head 50 includes a piston 170 which is located within a cylinder 172 formed in the housing 110 for the tong heads 50. The piston 170 provides the force for manipulating the bottle-gripping tongs 52 into and out of contact with the finish portion 54 (FIG. 4) of each bottle. The piston 170 includes a lower projection 174 and a pin 176 pivotably attaches the upper ends of two links 178 to the projection 174. Two tong arms 180 are pivotably attached to the lower ends of the links 178 by pins 182. The tong arms 180 are pivotably mounted on a shaft 184 which is fixed to the bottom of the tong head 50. The tongs 52 are bolted to the free ends of the tong arms 180 as shown in FIGS. 4 and 5. As the piston 170 is lowered, the pin 176 moves toward the fixed shaft 184, the distance between the pins 182 increases, and the tong arms 180 pivot about the fixed shaft 184 in a scissors-like fashion to increase the distance between the tongs 52. This type of movement will result in the tongs 52 releasing the bottles 42. Upward movement of the piston 170 causes the opposite or reverse type of movement to close the tongs 52. This type of movement will result in the tongs gripping the bottles 42 about the finish portion 54. Thus, the tongs 52 open and close due to a scissor action of the tong arms 180 created by vertical movement of the piston 170.

A spring 186 maintains the piston 170 an up position and biases the tongs 52 to the closed gripping position. To open the tongs 52, pressurized air is applied to the top of the piston 170 to compress the spring 186. Pressurized air for moving the piston 170 is fed into the cylinder housing 112 via a passageway 188 through the shaft 106. As is shown in FIG. 3, the passageway 188 is connected through an annular groove in the shaft 106 to a passage 188a formed in the take-out arm housing 86, through another annular groove in the shaft 82, through a passageway 188b formed in the shaft 82, to a port 188c in the column 62. Pressurized air is applied and relieved through the port 188c.

Air from the passageway 188 fills the annular opening 118 around the tong head shaft 152. The opening 118 is bounded by seals 190 to confine the air to the opening 118 during rotation of the shaft 152. A hole 192 is formed radially into the shaft 152 and directs the air within the opening 118 into an axial passageway 194 formed in the shaft 152. The passageway 194 extends through the shaft 152 and the flange 160.

An opening 196 is formed through the top plate 162 of the tong head housing 110 in alignment with the passageway 194 in the shaft 152. The opening 196 opens into a hollow neck 198 of the tong head housing 110. The air then moves from the neck 198 to a manifold 200 which runs the horizontal length of the housing 110 to provide communication with the piston cylinders 172 of each tong head 50 within the housing 110. Seals 202 prevent substantial air leakage around the piston 170 when the piston moves within the cylinder 172. When pressurized air is supplied through the passageway 188, the hole 192, the passageway 194, the opening 196 and the hollow neck 198 to the manifold 200, the piston 170 of each tong head 50 is forced downward. The tongs 52 are moved apart by the downward movement of the piston 170. Conversely, the tongs 52 are closed when the pressurized air to the piston 170 of each tong head 50 is vented or released and the compressed spring 186 is allowed to expand and raise each piston 170.

The take-out cycle begins with air pressure applied to the piston 170 to force it downward against the force of the spring 186 in the tong head cylinder 172. The tong arms 180 scissor to separate the tongs 52. The separated condition of the tongs 52 is the condition occurring after the bottles 42 from the previous take-out cycle have been released. The tongs 52 are maintained separated while the rack 92 is moved longitudinally to rotate the gear 88 and thereby pivot the take-out arm 58 at its inner end 60 until the tong head assembly 48 is located over the newly formed bottles in the blow mold 46. Since the tongs 52 are separated, the tongs 52 fit adjacent to the finish portion 54 on the newly formed bottles 42 in the blow mold 46. At this time the air pressure to the piston 170 is relieved and the spring 186 moves the piston upward. The tong arms 180 scissor in the other direction and the tongs 52 grip the finish portion 54. The blow mold 46 separates and the rack 92 is moved in the other longitudinal direction to pivot the take-out arm 58 and move the bottles forward from the blow mold 46 to a position over the dead plate 64. The housing 110 tong heads 50 rotates about the take-out arm 58 in a direction opposite to the rotation of the take-out arm 58 to maintain the vertical orientation of the bottles 42 during transfer from the blow mold 46 to the dead plate 64 (see FIGS. 1, 6 and 7). After suspending the glass bottles 42 over the dead plate 64 (FIG. 7) for the cooling period, or while the bottles are suspended over the dead plate 64 during the cooling period, the piston 120 is driven upward in the cylinder housing 112 to cause the follower pin 146 to follow the helical cam slot 142 and thereby rotate the tong head housing 110 and the gripped bottles 42 through the acute angle. Thereafter the take-out arm 58 is rotated slightly further by movement of the rack 92 to deposit the bottles 42 on the dead plate 64. Air pressure is applied to the piston 170 to cause the tongs 52 to open and release the bottles 42 onto the dead plate 64 (FIG. 9). The take-out arm 58 begins rotating in the opposite direction to allow the tongs 52 to clear the bottles 432, and the piston 120 is then moved back to the lower position to return the tong head housing 110 to its position in alignment with the next set of bottles formed in the blow mold 46. This take-out cycle is thereafter repeated on a continuous basis.

The pusher mechanism 70 commences operation at the end of the take-out cycle. The pusher mechanism 70 operates in a push-out cycle to transfer the bottles 42 from the acute angular position in which they are deposited on the dead plate 64 to the transfer conveyor 68. The push-out cycle incorporates both linear and rotational movement, and the movement and functionality of the pusher mechanism 70 is achieved by elements shown generally in FIG. 10. In general, the pusher mechanism 70 includes a linear carrier 204 which moves linearly along guide rails 206 and 208, a pedestal assembly 210 which is pivotably connected to the carrier 204, a pusher cylinder assembly 212 connected to the pedestal assembly 210 and a pusher plate 214. The pusher plate 214 is attached to the contact plate 76 and fingers 78. The pusher cylinder assembly 212 extends the contact plate 76 and fingers 78 into contact with the bottles on the dead plate 64. The linear carrier 204 imparts the linear movement to the bottles 42, and the pivoting pedestal assembly 210 imparts the rotary movement to the bottles as they are transferred to the conveyor 68. The pusher mechanism 70 is described in greater detail in association with FIGS. 10–22.

As is shown best in FIGS. 10–14, the dead plate 64 is mounted on a conveyor beam 216 which forms part of the support structure for the conveyor 68. The conveyor beam 216 is supported in the conventional manner by legs (not shown), and the legs attach to the frame of the IS with which the pusher mechanism 70 is associated. The upper surface of the dead plate 64 is essentially flush with the conveyor belt 72. An edge 218 of the dead plate 64 extends to the conveyor belt 72 at preferably the acute angle at which the take-out mechanism 44 aligns the bottles 42 on the dead plate 64. Thus, the edge 218 and the initial alignment of the bottles 42 on the dead plate 64 are preferably parallel. Of course, after the push-out cycle commences the parallel alignment is not maintained as the bottles 42 are rotated onto the conveyor belt 72.

The pair of horizontal linear guide rails 206 and 208 for the carrier 204 are rigidly mounted on a vertical wall member 220 of a wind box below the dead plate 64, as is shown in FIGS. 10 to 14. The wind box supplies the air which is delivered through the holes 66 in the dead plate. The carrier 204 includes channels 222 and 224 which slidably engage and are retained to the guide rails 206 and 208, respectively. Roller ball bearings 226 (FIG. 14) within the channels 222 and 224 allow the channels 222 and 224 to easily move along the guide rails 206 and 208, thereby also allowing the carrier 204 to slide easily along the length of the guide rails 206 and 208.

Between the two guide rails 206 and 208, a toothed belt 228 is supported between two sprockets 230 and 232. The sprockets 230 and 232 are rigidly connected to shafts 234 and 236, respectively, which are rotatably attached to extend outward from the vertical wall 220 by conventional bearing and mounting arrangements (not shown). A drive motor 238 (FIGS. 10, 12 and 13) turns a sprocket 240. The sprocket 240 is connected to a sprocket 242 by a toothed belt 244. The sprocket 242 is also rigidly attached to the shaft 236 so the sprockets 232 and 242 rotate in unison with each other. Upon the drive motor 238 rotating the sprocket 240, the belt 244 rotates the sprockets 242 and 232, and the belt 228 is also rotated.

The upper span of the belt 228 between the sprockets 230 and 232 is located closely adjacent to the upper channel 222 of the carrier 204. The belt 228 is fastened to the upper channel 222 by bolts 246 and a small attachment plate 248 as shown in FIGS. 10 and 14. Tightening the bolts 246 squeezes the belt 228 between the channel 222 and the plate 248 to attach the belt 228 to the carrier 204. As a consequence of this connection, the carrier 204 is moved along the guide rails 206 and 208 as the belt 228 is moved. The amount of rotation of the drive motor 238 can thereby precisely control the position, rate and direction of movement of the linear carrier 204 along the edge 218 of the dead plate 64. Preferably the drive motor 238 is an electrical servo motor which is capable of very precise rotational control to achieve the desired degree of control over the position and movement of the carrier 204.

The pedestal assembly 210 includes a main vertical shaft 250 which is rotationally attached by bearings 252 and 254 to mounting flanges 256 and 258 which extend from the linear carrier 204, as is shown in FIGS. 10, 12 and 13. A pivot motor 260 is suspended from a connection plate 262 which is also attached to the upper mounting flange 258. The pivot motor 260 turns a drive shaft 264 which passes through the plate 262 and rotates a sprocket 266 attached to the end of the drive shaft 264. The sprocket 266 drives a toothed belt 268 which in turn rotates a sprocket 270 which is rigidly attached to the vertical shaft 250. Thus, operation of the pivot motor 260 rotates the vertical shaft 250 in an amount, rate and direction controlled by the motor 260. Although not specifically shown the motor 260 is connected to a planetary gearbox to obtain additional torque. The pivot motor 260 is also preferably a servo motor.

The vertical shaft 250 is fixed to the underside of a pedestal 272 which in turn supports the pusher cylinder assembly 212, as is shown in FIGS. 12 and 13. Thus, the pusher cylinder assembly 212 rotates in unison with the pedestal 272 and the vertical shaft 250 when the pivot motor 260 operates. Of course, the pusher cylinder assembly 212 is also carried with the carrier 204 as it moves linearly along the guide rails 206 and 208. The linear movement of the carrier 204 and the independent pivotable movement of the pusher cylinder assembly 212 create the linear and rotational components of movement of the pusher mechanism 70.

The pusher cylinder assembly 212 includes a housing 274 and a pusher cylinder 276 shown by dashed lines in FIGS. 12 and 13. The pusher cylinder 276 is preferably a conventional piston and cylinder assembly which includes an internal piston (not shown) that is moved linearly under the influence of air pressure supplied to the cylinder 276 by air hoses 278 attached to the cylinder housing 274 as shown in FIGS. 12 and 13. The piston within the cylinder 276 is connected to a piston rod 280 which extends out of the cylinder housing 274. The pusher plate 214 is attached to the end of the rod 280 opposite the end which is attached to the piston within the cylinder 276. A support rod 282 is attached to a flange 284 atop the pusher plate 214 and passes through annular support bearings 286 formed within flanges 288 atop the pusher cylinder housing 274. The support rod 282 maintains the pusher plate 214 in alignment with the piston rod 280 during extension and retraction of the piston rod, thereby obtaining improved operation of the pusher cylinder assembly 212. The support rod 282 also supports a portion of the weight of the pusher plate 214, rather than requiring the piston rod 280 to fully support the weight of the pusher plate. As an alternative to the piston and cylinder assembly 212, an electric servo motor driving a ball screw arrangement could be employed. Such an arrangement provides excellent control of the movement of the pusher plate along its movement path, allowing a wide variety of motion profiles to be created.

The contact plate 76 is attached to the pusher plate 214, and the equally spaced fingers 78 are attached to the contact plate 76 as shown in FIGS. 10-13. The fingers 78 project outward from the contact plate 76 at the same intervals as the bottles 42 are spaced when they are released by the take-out mechanism 44. Accordingly, when the pusher cylinder 276 extends the pusher plate 214, the contact plate 76 and the fingers 78 are in the appropriate position to contact the bottles 42 from the side and from behind to move them onto the transfer conveyor belt 72, as shown in FIG. 15.

The attachment of the pusher cylinder assembly 212 atop the pivotable pedestal assembly 210, the attachment of the pedestal assembly 210 to the linear carrier 204, and the linear movement of the carrier 204 allows the pusher plate 214 to be extended, retracted, linearly translated, and rotated in movements which are all independent of each other. These ranges and types of motion are all utilized in the push-out cycle accomplished by the pusher mechanism 70.

The push-out cycle is illustrated in FIGS. 15 to 22. The push-out cycle sequence of operation begins with the bottles 42 aligned on the dead plate 64 parallel to the edge 218 at the acute angle to the conveyor belt 72 (FIG. 10). The piston rod 280 extends the pusher plate 214 toward the bottles 42 to engage the contact plate 76 and fingers 78 with the bottles 42 (FIGS. 13, 14 and 16). The drive motor 238 propels the linear carrier 204 along the guide rails 206 and 208, accelerating the bottles 42 toward the conveyor belt 72. Simultaneously, the pivot motor 260 starts pivoting the pusher cylinder assembly 212 and the attached contact plate 76, fingers 78 and bottles 42 (FIGS. 15, 17 and 18). The linear and rotational movement of the bottles 42 continues until the bottles are inserted into an open space 74 on the conveyor belt 72 (FIGS. 15 and 19). This movement imparts the bottles with a velocity in the direction of the belt 72 which approximates that of the belt itself. Of course the linear movement of the carrier 204 and the pivoting movement of the pusher assembly and the extension of the pusher plate are all coordinated from a timing standpoint to insert the bottles in open spaces on the transfer conveyor.

Following transfer of the bottles 42 to the transfer conveyor belt 72, the piston rod 280 is quickly retracted to prevent the fingers 78 from contacting the bottles 42 following the fingers 78 (FIG. 20). Once the contact plate 76 and fingers 78 clear the bottles on the conveyor belt 72, the drive motor 238 returns the linear carrier 204 along the guide rails 206 and 208 while the pivot motor 260 returns the pusher cylinder 276 to its initial orientation perpendicular to the edge 218 of the dead plate 64 and to the next group of bottles 42 on the dead plate. This push-out cycle then repeats each time the take-out mechanism 44 delivers a new group of bottles 42 to the dead plate 64.

The combination of rotational and translational movement, as opposed to purely rotational movement achieved by the prior art rotary pushers, effectively reduces centrifugal forces upon the bottles 42. The initial orientation of the bottles on the dead plate 64 is in an alignment which makes an acute angle to the conveyor. This initial orientation of the bottles accounts for a portion of the rotation which must be imparted to the bottles, thereby reducing the amount of rotational movement that the pusher mechanism 70 must impart to the bottles. The linear movement of the pusher mechanism 70 provides an opportunity to accelerate the bottles with a component of movement parallel to the transfer conveyor 68 without having to rely on rotation alone to achieve the final desired linear velocity of the bottles as they are transferred to the conveyor belt 72. The initial placement of the bottles at the acute angle reduces the angular velocity required to transfer the bottles to the conveyor belt 72 which reduces the possibility of instability due to centrifugal force. Furthermore, the effect of the simultaneous linear movement and rotational movement has the effect of moving the bottles through an arc, shown in FIG. 15, which has a greater radius than the radius between the vertical shaft 250 and the pusher plate 214. By increasing the radius of the arc of rotation of the bottles, the centrifugal force on the bottles is reduced.

However, to optionally provide additional protection against inadvertent instabilities of the bottles 42 when they are transferred to the conveyor belt 72 at the greater belt velocities, each IS may utilize a blower block 80 to direct a pulse of air from a nozzle 290 at each bottle as it is rotated onto the conveyor belt 72. Three separate nozzles 290 are used on each block 80, one for each of the bottles. The nozzles 290 are connected to a source of compressed air by an air hose 292, and a valve (not shown) in each air hose 292 controls the delivery of the pulse of air. Each nozzle 290 targets an individual bottle 42 with the air pulse, and the air pulse counteracts the centrifugal force on each of its target bottles as the bottles move onto the conveyor belt 72. The air pulses delivered by the nozzles 290 may even help maintain the bottles 42 in contact with the contact plate 76 and fingers 78 during transfer to the conveyor belt 72, depending on the length and duration of the pulses. The duration of the air pulse is very short to prevent disturbing bottles which precede or follow the target bottles. The opening and closing of the valves which deliver the air pulses is timed to occur in synchronization with the positioning of the bottles by the pusher mechanism 70.

Another optional feature of the present invention is an alternative embodiment 300 of the pusher mechanism (FIGS. 23 to 26). The pusher mechanism 300 may be useful in reducing the possibility of the fingers 78 inadvertently contacting the bottles on the conveyor belt 72 before the pusher plate 214 can be withdrawn (consider FIG. 20). The pusher mechanism 300 may also be useful in decreasing the rate at which the pusher cylinder assembly 212 needs to be rotated back to its initial position during movement of the pusher mechanism back to its initial position (consider FIG. 21). At a minimum, the pusher mechanism 300 imparts an additional realm of movement to the push-out cycle. The pusher mechanism 300 is similar to the previously described embodiment of the pusher mechanism 70, but additionally employs a pneumatic pop-up cylinder 302 to vertically lift the pusher cylinder assembly 212 and the attached pusher plate 214 above the bottles. The pusher mechanism 300 has generally the same elements as those previously described in conjunction with the pusher mechanism 70, and the same reference numerals will be used to describe elements which were not altered between the first and alternative embodiments.

In the preferred embodiment of the pusher mechanism 300, the pivot motor 260 and the vertical shaft 250 of the pedestal assembly 210 are mounted on a second vertical carrier 304. Vertical guide rods 306 are attached between mounting flanges 308 and 310 on the lower and upper ends of the carrier 204, respectively. The vertical carrier 304 is slidably attached to the guide rods 306 by annular guide bearings 312 which are positioned within flanges 314 attached to the vertical carrier 304. Of course, the carrier 204 moves horizontally along the guide rails 206 and 208. The pneumatic cylinder 302 is attached to and extends below the lower horizontal flange 308 on the horizontal carrier 204. A piston (not shown) within the pop-up cylinder 302 is moved along the length of the cylinder 302 by pressurized air supplied by hoses 316 and 318. The piston within the cylinder 302 is connected to a piston rod 320 which extends through the lower flange 308 of the horizontal carrier 204 and is attached to a bottom plate 322 of the vertical carrier 304. Movement of the piston in the cylinder 302 thus raises or lowers the vertical carrier 304 independent of the position of the horizontal carrier 204. As an alternative to the pneumatic pop-up cylinder 302, a servo motor controlled ball screw arrangement may be employed.

The pivot motor 260 is suspended from a top plate 324 of the vertical carrier 304. The vertical shaft 250 is rotatably attached to the vertical carrier 304 by bearings (not shown) in the bottom plate 322 and in the top plate 324. The pivot motor 260 rotates the vertical shaft 250 which in turn rotates the pedestal 272 and the attached pusher cylinder assembly 212. The operation of the pedestal assembly 210 and the pusher cylinder assembly 212 is similar to that described above with respect to the pusher mechanism 70.

The push-out cycle of the pusher mechanism 300 is similar to that shown in FIGS. 15 to 22, except for the vertical movement of the pedestal and pusher cylinder assemblies 210 and 212 which may occur at any time during the push-out cycle, but preferably occurs following transfer of the bottles 42 to the conveyor belt 72. The pusher mechanism 300 simply adds the potential for advantageous vertical movement to the linear and rotary movements achieved by the pusher mechanism 70.

Both embodiments 70 and 300 of the pusher mechanism of the present invention represent an improvement over prior art rotary pushers due to the effectiveness of the mechanisms 70 and 300 in reliably transferring bottles 42 to a faster transfer conveyor belt 72. The combined linear and rotary motion of the contact plate 76 and fingers 78 reduce the forces imparted on the bottles 42 during transfer to a higher speed conveyor belt 72.

A presently preferred embodiment of the present invention and many of its improvements have been described with a degree of particularity. This description has been made by way of preferred example and is based on a present understanding of knowledge available regarding the invention. It should be understood, however, that the scope of the present invention is defined by following claims, and not necessarily by the detailed description of the preferred embodiment.

I claim:

1. A pusher mechanism for use in transferring a plurality of glass articles onto a moving conveyor belt after the articles have been formed in a mold of an IS of a glassware forming machine and deposited in a predetermined orientation on a dead plate adjacent to the conveyor belt, said pusher mechanism comprising:

an article contact assembly for contacting the articles supported on the dead plate and pushing the articles from the dead plate to the conveyor belt;

a pivotable assembly connected to the article contact assembly for moving the article contact assembly in rotational movement through an arc to position the articles on the conveyor belt; and a carriage assembly connected to the pivotable assembly for moving the pivotable assembly in linear movement in a direction having a movement component parallel to the direction of movement of the conveyor belt.

2. A pusher mechanism as defined in claim 1 wherein: the rotational movement of the article contact assembly occurs independently of the linear movement of the pivotable assembly.

3. A pusher mechanism as defined in claim 1 wherein: the rotational movement of the article contact assembly occurs during the linear movement of the pivotable assembly.

4. A pusher mechanism as defined in claim 3, for use with an IS which initially deposits the articles in a predetermined orientation on the dead plate in a line which extends at an initial acute angle converging toward the direction of movement of the conveyor belt, and wherein:

the article contact assembly contacts the line of articles substantially at the initial acute angle;

the linear movement of the pivotable assembly is substantially parallel to the initial acute angle of the line of articles; and the rotational movement of the article contact assembly moves the articles from the acute angle into an aligned orientation parallel to the direction of movement of the conveyor belt with which said pusher mechanism is used.

5. A pusher mechanism as defined in claim 4 wherein:
the linear movement of the pivotable assembly and the rotational movement of the article contact assembly effectively lengthen a radius of curvature of a path taken by the articles moving between their initial position on the dead plate and their aligned position on the conveyor belt, compared to a radius of curvature of the arc of the rotational movement of the article contact assembly.

6. A pusher mechanism as defined in claim 4, for use with the conveyor belt which moves at a predetermined rate, and wherein:

the movement of the articles in the direction parallel to the direction of movement of the conveyor belt at the end of the rotational movement of the contact assembly is substantially equal to the rate of movement of the conveyor belt.

7. A pusher mechanism as defined in claim 3, for use with the conveyor belt which moves at a predetermined rate, and wherein:

the rate of movement of the articles in a direction parallel to the direction of movement of the conveyor belt due to the rotation of the contact assembly by the pivotable assembly at the end of the rotational movement and the component of the linear motion of the carrier assembly are additive and the rate of the resultant movement of the articles parallel to the direction of movement of the conveyor belt is adapted to be substantially equal the rate of movement of the conveyor belt.

8. A pusher mechanism as defined in claim 1 wherein the article contact assembly further comprises:

a pusher member for contacting the articles; and an extension device connected to the pusher member for moving the pusher member in an extension movement along a radial path of the arc traversed by the article contact assembly.

9. A pusher mechanism as defined in claim 8 wherein:
the extension movement of the pusher member occurs independently of the rotational movement of the article contact assembly and independently of the linear movement of the pivotable assembly.

10. A pusher mechanism as defined in claim 8 for use with an IS to achieve a push out cycle during which the articles are transferred from the dead plate to the conveyor belt, wherein:

the extension movement of the pusher member is adapted to occur during the push-out cycle.

11. A pusher mechanism as defined in claim 8, for use with an IS which initially deposits the articles on the dead plate in a line with one another and the line extends at an initial acute angle converging toward the direction of movement of the conveyor belt, and wherein:

the extension movement of the pusher member is adapted to be in a direction toward the articles as initially deposited on the dead plate and at an angle which is essentially perpendicular to the initial line of articles deposited on the dead plate.

12. A pusher mechanism as defined in claim 8 further comprising:

a lifting assembly operatively connected to at least one of the article contact assembly or the pivotable assembly and operative for lifting the article contact assembly in a vertical movement out of contact with the articles.

13. A pusher mechanism as defined in claim 12 wherein:

the vertical movement of the lifting assembly occurs independently of the rotational movement of the article contact assembly and independently of the linear movement of the pivotable assembly and independently of the extension movement of the pusher member.

14. A pusher mechanism as defined in claim 1 further comprising:

a lifting assembly operatively connected to at least one of the article contact assembly or the pivotable assembly and operative for lifting the article contact assembly in a vertical movement out of contact with the articles.

15. A pusher mechanism as defined in claim 14 wherein:

the vertical movement of the lifting assembly occurs independently of the rotational movement of the article contact assembly and independently of the linear movement of the pivotable assembly.

16. A pusher mechanism as defined in claim 14 for use with an IS to achieve a push out cycle during which the articles are transferred from the dead plate to the conveyor belt, wherein:

the vertical movement of the lifting assembly is adapted to occur during the push-out cycle.

17. A pusher mechanism as defined in claim 16 wherein:

the article contact assembly further comprises a pusher member for contacting the articles; and the vertical movement of the lifting assembly lifts the pusher member above the articles and out of contact with the articles at the end of a push-out cycle.

18. A pusher mechanism as defined in claim 1 in combination with a nozzle for use with the conveyor belt, wherein:

the pusher mechanism is adapted to be connected to one side of the conveyor belt; and the nozzle is adapted to be connected to an opposite side of the conveyor belt facing the pusher mechanism, the nozzle delivering a flow of air against the articles as the articles are transferred onto the conveyor belt to counteract centrifugal forces applied to the articles by the pusher mechanism.

19. A pusher mechanism as defined in claim 1, for use with an IS which initially deposits the articles on the dead plate in a line with one another and the line extends at an initial acute angle converging toward the direction of movement of the conveyor belt, and wherein:

the article contact assembly is adapted to contact the line of articles substantially at the initial acute angle in which the articles are placed on the dead plate.

20. A pusher mechanism as defined in claim 19 in combination with a take-out mechanism for use with the IS, wherein:
- the articles are formed in a linear alignment with one another in the mold of the IS;
- the pusher mechanism is adapted to be connected to the IS of the glassware forming machine; and
- the take-out mechanism is adapted to be connected to the IS of the glassware forming machine, said take-out mechanism comprising:
  - a tong head assembly having tongs arranged in a linear alignment with one another for gripping the articles in the mold of the IS and maintaining the linear alignment of the articles;
  - a translation device connected to the tong head assembly for translating the tong head assembly in a linear path in alignment with the linear alignment of the articles in the mold, the translation device translating the tong head assembly between a first position at which the tongs grip the articles in the mold of the IS and a second position at which the tongs release the articles on the dead plate of the IS; and
  - a rotational assembly for rotating a portion of the tong head assembly to initially deposit the articles on the dead plate of the IS in the line with one another, the line extending along the initial acute angle converging toward the direction of movement of the conveyor belt.

21. A pusher mechanism in combination with a take-out mechanism as defined in claim 20 wherein:
- the linear movement of the pivotable assembly is substantially parallel to the initial acute angle of the line of articles.

22. A pusher mechanism in combination with a take-out mechanism as defined in claim 20 wherein:
- the rotational movement of the portion of the tong head assembly occurs independently of the rotational movement of the article contact assembly and independently of the linear movement of the pivotable assembly and independently of the translational movement of the tong head assembly.

23. A pusher mechanism in combination with a take-out mechanism as defined in claim 20 wherein the rotational assembly further comprises:
- a shaft extending vertically within the tong head assembly; and
- means connected to the shaft for rotating the shaft to accomplish the rotational movement of the portion of the tong head assembly.

24. A pusher mechanism in combination with a take-out mechanism as defined in claim 23 wherein the means for rotating the shaft further comprises:
- a cylinder housing defining a cylinder;
- a piston positioned for longitudinal and rotational movement within the cylinder under the influence of pressurized fluid applied thereto, the shaft extending into the cylinder and connected to the piston to rotate in unison with the piston while the piston moves longitudinally relative to the shaft;
- a cap member connected to the cylinder housing and defining a helical cam slot extending in both the rotational and longitudinal directions of movement of the piston; and
- a follower member connected to the piston and extending into the helical cam slot to cause the piston to rotate when the piston is moved longitudinally under the influence of the pressurized fluid applied to the piston.

25. A pusher mechanism for use in transferring a plurality of glass articles onto a moving conveyor belt after the articles have been formed in a mold of an IS of a glassware forming machine and deposited in a predetermined orientation on a dead plate adjacent to the conveyor belt, said pusher mechanism comprising:
- an article contact assembly adapted for contacting the articles supported on the dead plate and pushing the articles from the dead plate to the conveyor belt;
- a pivotable assembly connected to the article contact assembly for moving the article contact assembly in rotational movement through an arc to impart a movement component to the articles in a direction adapted to be in a direction of movement of the conveyor belt; and
- a carriage assembly connected to the pivotable assembly for moving the pivotable assembly in linear movement in a direction having a motion component adapted to be parallel to the direction of movement of the conveyor belt.

26. A pusher mechanism as defined in claim 25, for use with an IS which initially deposits the articles on the dead plate in a line with one another and the line extends at an initial acute angle converging toward the direction of movement of the conveyor belt, and wherein:
- the article contact assembly is adapted to contact the line of articles substantially at the initial acute angle;
- the linear movement of the pivotable assembly is substantially adapted to be parallel to the initial acute angle of the line of articles; and
- the arc of the rotational movement of the article contact assembly is substantially equal to the initial acute angle.

27. A pusher mechanism as defined in claim 25 wherein:
- the rotational movement of the article contact assembly occurs during the linear movement of the pivotable assembly.

28. A pusher mechanism as defined in claim 27, for use with the conveyor belt which moves at a predetermined rate, and wherein:
- the movement of the articles in a direction parallel to the direction of movement of the conveyor belt at the end of the arc occurs at a rate which is adapted to be substantially equal to the rate of movement of the conveyor belt.

* * * * *